(12) United States Patent
Ito et al.

(10) Patent No.: US 9,883,091 B2
(45) Date of Patent: Jan. 30, 2018

(54) DEVICE CONTROL BASED ON ATTACHMENT/DETACHMENT INFORMATION

(71) Applicant: SONY CORPORATION, Tokyo (JP)

(72) Inventors: Ryogo Ito, Tokyo (JP); Kazuma Akamatsu, Tokyo (JP); Shunsuke Katsumata, Kanagawa (JP); Shiro Eshita, Tokyo (JP); Megumi Takagi, Kanagawa (JP); Ayumi Yamamoto, Tokyo (JP); Yoko Fukata, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/034,920

(22) PCT Filed: Jul. 31, 2014

(86) PCT No.: PCT/JP2014/070159
§ 371 (c)(1),
(2) Date: May 6, 2016

(87) PCT Pub. No.: WO2015/075973
PCT Pub. Date: May 28, 2015

(65) Prior Publication Data
US 2016/0295090 A1 Oct. 6, 2016

(30) Foreign Application Priority Data
Nov. 19, 2013 (JP) .................. 2013-238428

(51) Int. Cl.
*H04N 5/232* (2006.01)
*G03B 17/02* (2006.01)
(Continued)

(52) U.S. Cl.
CPC ......... *H04N 5/23203* (2013.01); *G03B 17/02* (2013.01); *H04M 1/0264* (2013.01);
(Continued)

(58) Field of Classification Search
CPC ............ H04N 5/23203; H04N 5/2256; H04N 5/23293; H04N 5/23245; G03B 17/02
See application file for complete search history.

(56) References Cited

U.S. PATENT DOCUMENTS

| | | | | |
|---|---|---|---|---|
| 6,148,141 A | * | 11/2000 | Maeda | H04N 5/77 348/231.99 |
| 7,042,499 B1 | * | 5/2006 | Kido | H04N 1/00204 348/208.16 |

(Continued)

FOREIGN PATENT DOCUMENTS

| | | |
|---|---|---|
| EP | 1096771 A1 | 5/2001 |
| JP | 2004-173036 A | 6/2004 |

(Continued)

OTHER PUBLICATIONS

International Search Report received for PCT Application No. PCT/JP2014/070159, dated Oct. 28, 2014, 2 pages.

(Continued)

*Primary Examiner* — Padma Haliyur
(74) *Attorney, Agent, or Firm* — Chip Law Group

(57) ABSTRACT

An imaging system is provided with a controller. The controller performs a status control of an imaging device depending on attachment/detachment information indicating whether the imaging device and an information processing device are in an attachment status in which the imaging device and the information processing device are attached to each other or in a detachment status in which the imaging device and the information processing device are detached from each other.

19 Claims, 17 Drawing Sheets

(51) Int. Cl.
*H04N 5/225* (2006.01)
*H04M 1/02* (2006.01)
(52) U.S. Cl.
CPC ....... *H04N 5/2256* (2013.01); *H04N 5/23245* (2013.01); *H04N 5/23293* (2013.01); *H04N 2201/0072* (2013.01)

(56) References Cited

U.S. PATENT DOCUMENTS

| | | | | |
|---|---|---|---|---|
| 8,704,929 | B2* | 4/2014 | Imai | H04N 5/23222 348/207.99 |
| 2005/0248683 | A1* | 11/2005 | Ariga | H04N 5/2251 348/370 |
| 2010/0259615 | A1 | 10/2010 | Yamamoto | |
| 2012/0044373 | A1* | 2/2012 | Shiozaki | G03B 35/08 348/218.1 |
| 2015/0201131 | A1* | 7/2015 | Ohshima | H04N 5/23293 348/333.07 |

FOREIGN PATENT DOCUMENTS

| | | |
|---|---|---|
| JP | 2007-116474 A | 5/2007 |
| JP | 2007-316497 A | 12/2007 |
| JP | 2009-232328 A | 10/2009 |
| JP | 2012-186698 A | 9/2012 |

OTHER PUBLICATIONS

Written Opinion received for PCT Application No. PCT/JP2014/070159, dated Oct. 28, 2014, 10 pages.
International Preliminary Report received for PCT Application No. PCT/JP2014/070159, dated May 24, 2016, 8 pages.
Extended European Search Report of EP Patent Application No. 14864072.5, dated May 19, 2017, 8 pages.

* cited by examiner

FIG.4
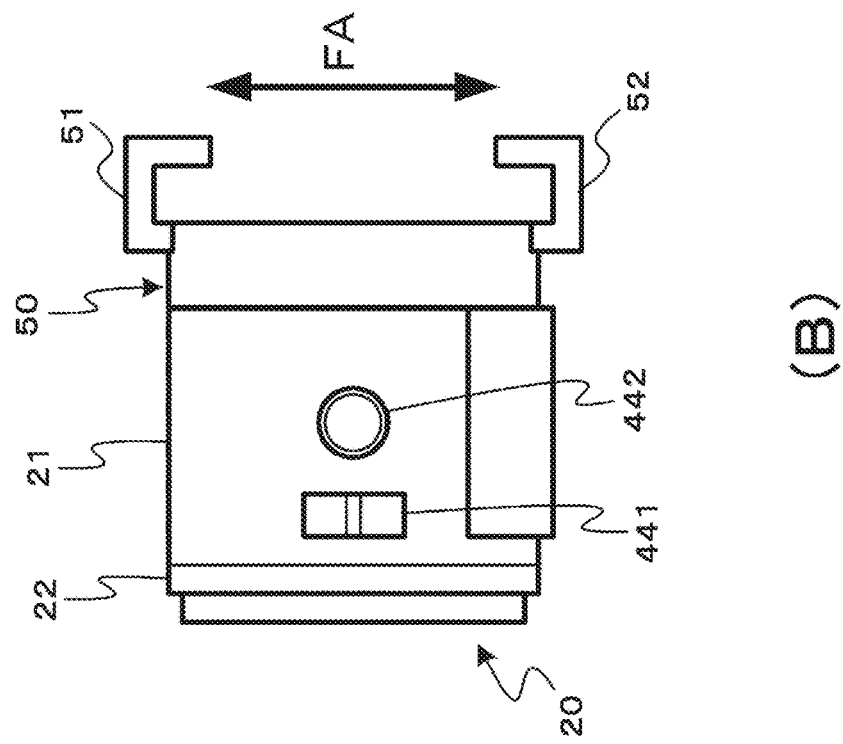
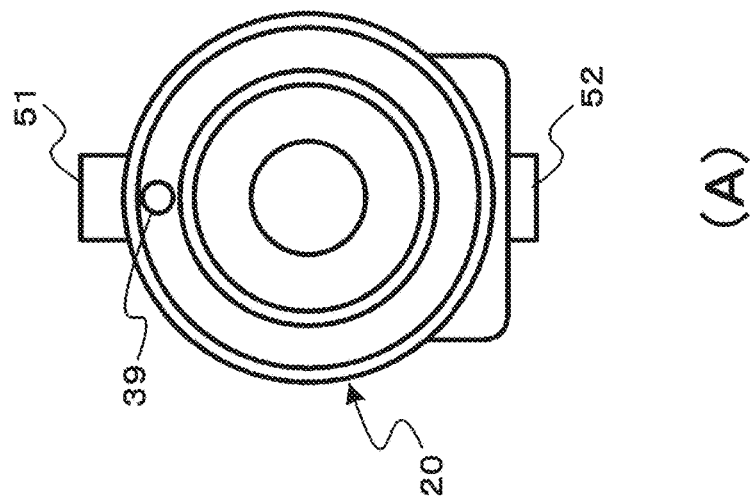

FIG.8
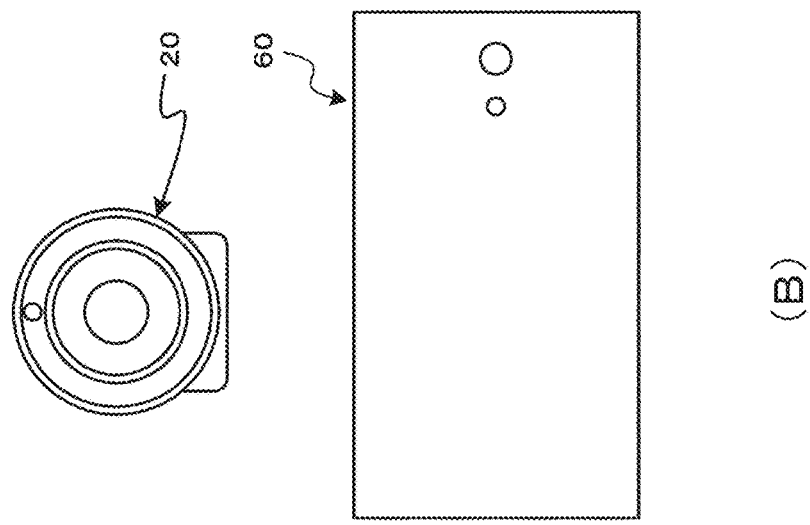
(B)
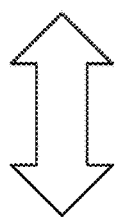
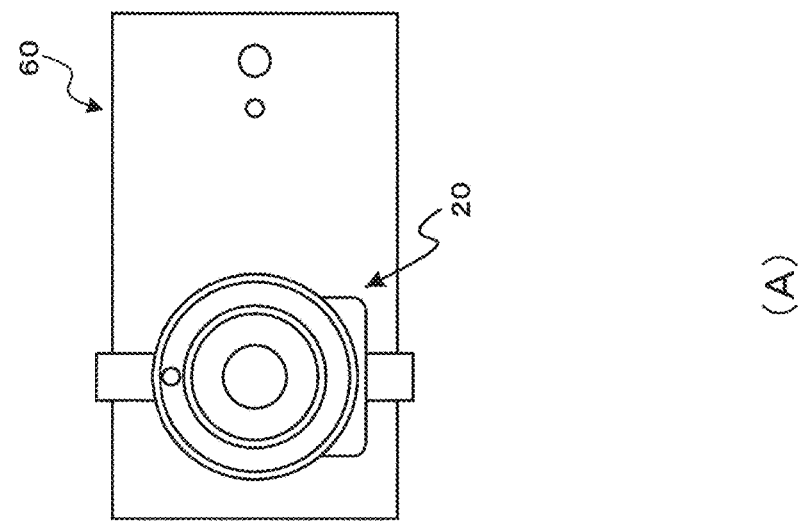
(A)

FIG.22
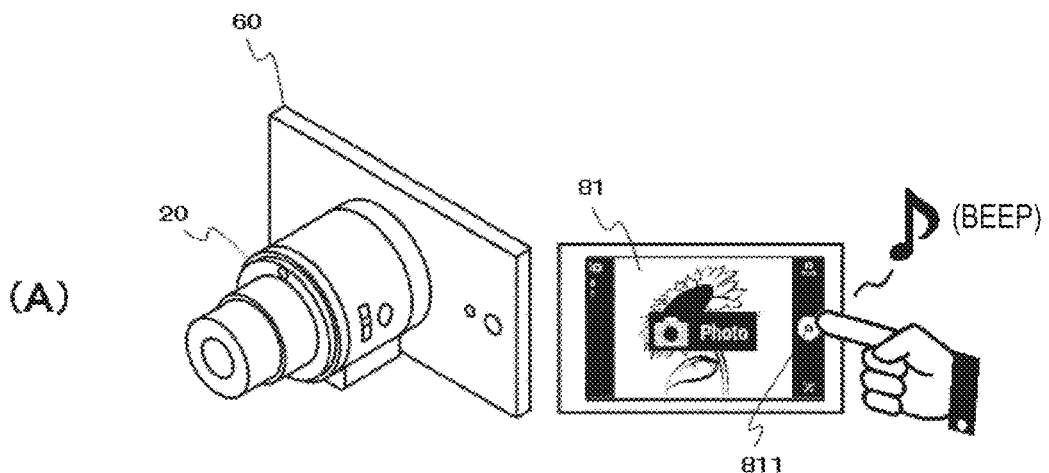
(A)
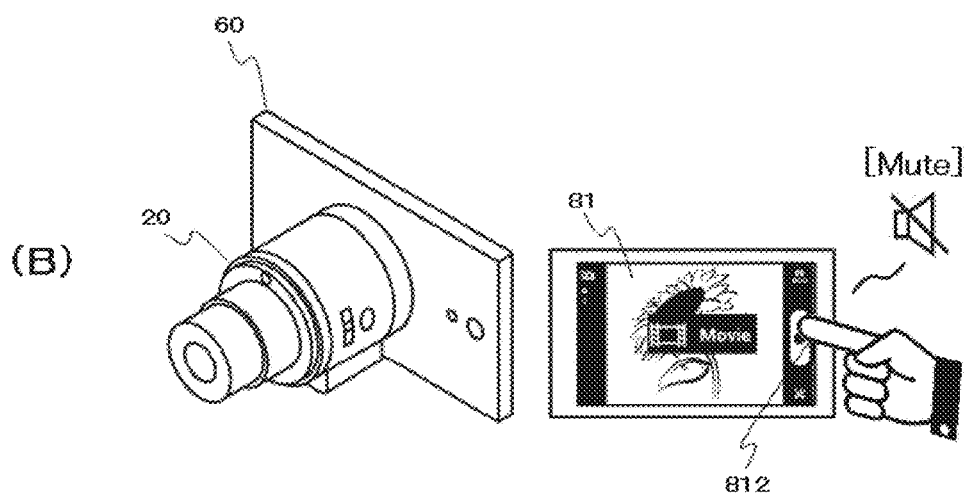
(B)

DEVICE CONTROL BASED ON ATTACHMENT/DETACHMENT INFORMATION

CROSS REFERENCE TO RELATED APPLICATIONS

This application is a U.S. National Phase of International Patent Application No. PCT/JP2014/070159 filed on Jul. 31, 2014, which claims priority benefit of Japanese Patent Application No. JP 2013-238428 filed in the Japan Patent Office on Nov. 19, 2013. Each of the above-referenced applications is hereby incorporated herein by reference in its entirety.

TECHNICAL FIELD

The present technology relates to an imaging system, an imaging device, an information processing device and method, and a program, and the present technology allows the status control of an imaging device or an information processing device to be easily performed.

BACKGROUND ART

In related art, an imaging device such as digital still camera or digital video camera, which generates image data by capturing a subject and records the image data as the content, has been widespread. In addition, with the spread of an information processing device (e.g. smartphone or the like) for exchanging various data using wireless communication, techniques for allowing the information processing device to remotely operate an imaging device wirelessly from a distance have been developed (e.g. see Patent Literature 1).

CITATION LIST

Patent Literature

Patent Literature 1: JP 2012-186698A

SUMMARY OF INVENTION

Technical Problem

However, it is desirable to further improve the user interface in a system that remotely operates the imaging device using the information processing device.

Therefore, in the present technology, there is provided an imaging system, imaging device, information processing device and method, and program, capable of easily performing the status control of the imaging device or the information processing device.

Solution to Problem

A first aspect of the present technology is an imaging system including: a controller configured to perform a status control of an imaging device or a status control of an information processing device depending on attachment/detachment information indicating whether the imaging device and the information processing device are in an attachment status in which the imaging device and the information processing device are attached to each other or in a detachment status in which the imaging device and the information processing device are detached from each other.

In the imaging system according to the technology, for example, the communication is performed between the imaging device having no function of displaying a captured image and the information processing device having a function of displaying an image, and the captured image generated by the imaging device is displayed on the display unit of the information processing device. The attachment status in which the imaging device and the information processing device are attached to each other and the detachment status in which they are detached are switchable, the attachment/detachment determination unit determines whether they are in the attachment status or the detachment status depending on the attachment/detachment indicating whether they are in the attachment status or the detachment status, and a status control of the imaging device or the information processing device is performed based on a result obtained by the determination.

As the status control of the imaging device, the control of a function influencing the status of the captured image and/or the control of a function influencing the power consumption is performed depending on the attachment/detachment information. For example, when the attachment/detachment information indicates that they are in the detachment status, a control for limiting the focus adjustment function of the imaging device to the autofocus function is performed. In addition, when the attachment/detachment information indicates that they are in the attachment status, a control for stopping an illumination function of the imaging device is performed. In addition, when the attachment/detachment information indicates that they are in the detachment status, a control for causing the frame rate of the captured image supplied from the imaging device to the information processing device to be lower than a case where the attachment/detachment information indicates as being the attachment status is performed. Furthermore, when the attachment/detachment information indicates that they are in the attachment status, a control for stopping a power supply to a sensor of the imaging device that has a similar function to a sensor provided in the information processing device is performed. In addition, in the status control of the imaging device, a mode that is preset by the user may be allowed to be set depending on the attachment/detachment information.

As the status control of the information processing device, a control of a function for the timing of recording operation and/or output of an operation sound is performed depending on the attachment/detachment information. When the attachment/detachment information indicates that they are in the attachment status, a control for starting a recording operation after an operation sound indicating a recording start operation is outputted or a control for ending the recording operation before an operation sound indicating a recording end operation is outputted is performed. In addition, when the attachment/detachment information indicates that they are in the attachment status, a control for preventing an operation sound from being outputted in the operation mode in which the imaging device records a sound.

A second aspect of the present technology is an imaging control method including: a process of performing a status control of an imaging device or a status control of an information processing device depending on attachment/detachment information indicating whether the imaging device and the information processing device are in an attachment status in which the imaging device and the information processing device are attached to each other or in a detachment status in which the imaging device and the information processing device are detached from each other.

A third aspect of the present technology is a program for causing a computer to execute a status control of an imaging device or an information processing device, the program for causing the computer to execute: a procedure of performing a status control of an imaging device or a status control of an information processing device depending on attachment/detachment information indicating whether the imaging device and the information processing device are in an attachment status in which the imaging device and the information processing device are attached to each other or in a detachment status in which the imaging device and the information processing device are detached from each other.

Note that the program according to the present technology is a program that can be provided to a general-purpose computer capable of executing various program codes through a storage medium such as optical disk, magnetic disk, and semiconductor memory, or a communication medium such as network in a computer-readable format. Providing such a program in a computer-readable format enables a processing according to the program to be performed on the computer.

A fourth aspect of the present technology is an imaging device including: a controller configured to perform a status control depending on attachment/detachment information indicating whether the imaging device is in an attachment status in which the imaging device is attached to an information processing device or is in a detachment status in which the imaging device is detached from the information processing device.

A fifth aspect of the present technology is an information processing device including: a communication unit configured to communicate with an imaging device; and a controller configured to perform a status control of the imaging device via the communication unit depending on attachment/detachment information indicating whether the information processing device is in an attachment status in which the information processing device is attached to the imaging device or is in a detachment status in which the information processing device is detached from the imaging device.

Advantageous Effects of Invention

According to the present technology, the status control of the imaging device or the information processing device is performed depending on the attachment/detachment information indicating that the imaging device and the information processing device are in the attachment status in which they are attached to each other or in the detachment status in which they are detached from each other. Thus, it is possible to perform easily the status control of the imaging device or the information processing device. The advantageous effects described herein are illustrative only and are not intended to be limiting, and other additional effects may be expected.

BRIEF DESCRIPTION OF DRAWINGS

FIG. 4 is a diagram illustrating the appearance configuration of an imaging device.

FIG. 8 is a diagram illustrating an attachment/detachment status between the imaging device and the information processing device.

FIG. 22 is a diagram illustrating an exemplary operation of the sixth status control.

DESCRIPTION OF EMBODIMENTS

The modes for carrying out the present technology will be described. The description will be given in the following order.

1. Functional Configuration of Imaging System
2. Appearance of Imaging System
3. Functional Configuration of Imaging Device
4. Functional Configuration of Information Processing Device
5. Operation by Imaging System
5-1. Association between Imaging Device and Information Processing Device
5-2. Status Control
5-2-1. First Status Control
5-2-2. Second Status Control
5-2-3. Third Status Control
5-2-4. Fourth Status Control
5-2-5. Fifth Status Control
5-2-6. Sixth Status Control <1. Functional Configuration of Imaging System>

Figure 1:
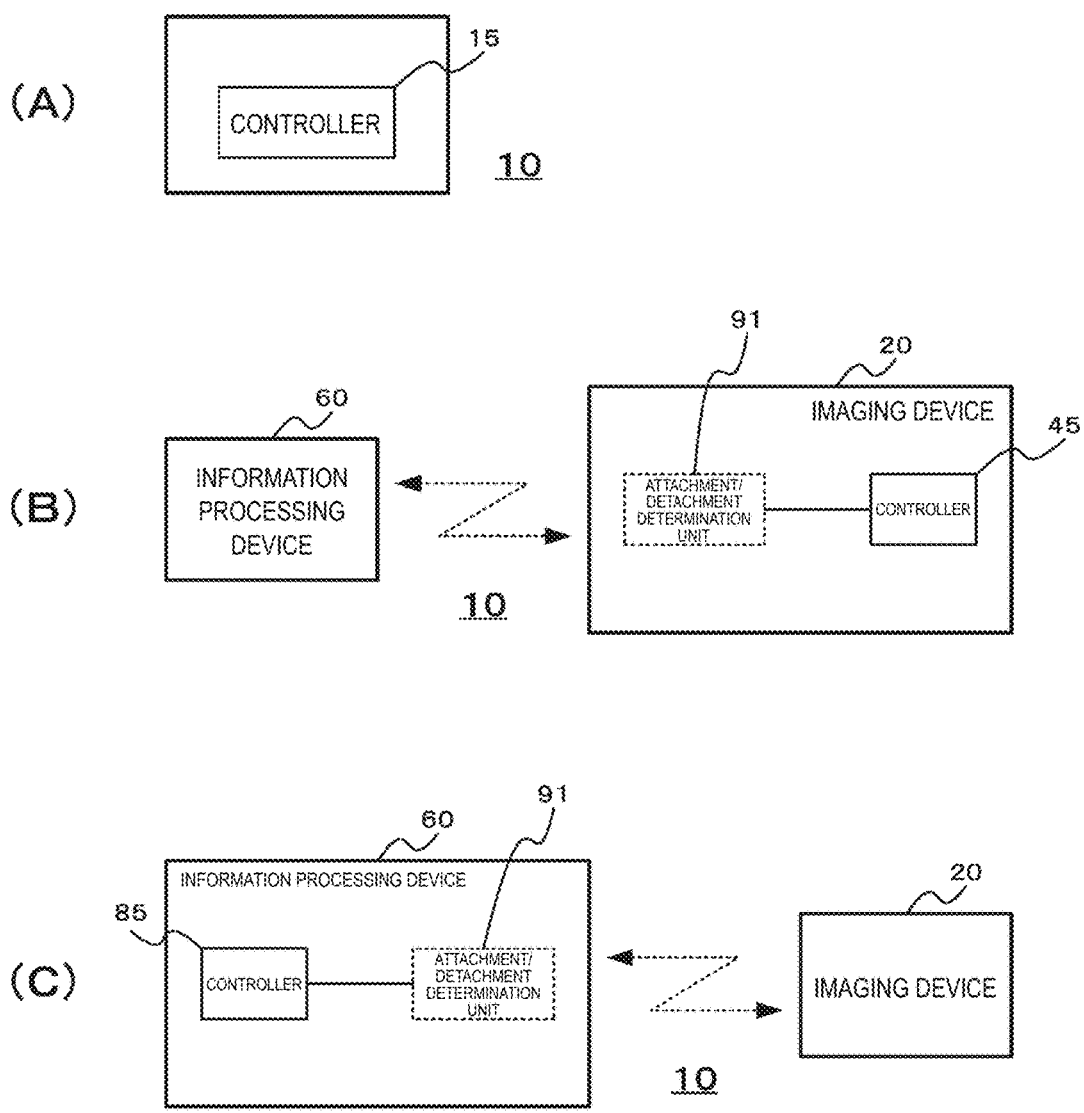
FIG. 1 is a diagram illustrating the functional configuration of an imaging system.

FIG. 1 illustrates the functional configuration of an imaging system 10 of the present technology. As shown in the part (A) of FIG. 1, the imaging system 10 is configured to include a controller 15. The controller 15 has a function of performing the status control of an imaging device or an information processing device depending on attachment/detachment information. This attachment/detachment information indicates whether they are in an attachment status in which the imaging device and the information processing device are attached to each other or a detachment status in which they are detached from each other. In the imaging system 10, the controller 15 may be provided in the imaging device or may be provided in the information processing device. In addition, an adaptor that is used to attach the imaging device and the information processing device to each other may be provided. For example, the part (B) of FIG. 1 illustrates the case that, in the imaging system 10, a controller 45 used to control the operation of an imaging device 20 is allowed to have a function of performing the status control of the imaging device or an information processing device. In addition, for example, the part (C) of FIG. 1 illustrates the case that, in the imaging system 10, a controller 85 used to control the operation of an information processing device 60, is allowed to have a function of performing the status control of the imaging device or an information processing device. The imaging system 10 shown in the part (A) of FIG. 1 corresponds to an imaging control device having a function of the status control of the imaging device and the information processing device. The imaging system 10 shown in the part (B) of FIG. 1 corresponds to the case that the imaging device 20 is provided with the imaging control device. The imaging system 10 shown in the part (C) of FIG. 1 corresponds to the case that the information processing device 60 is provided with the imaging control device.

In addition, the imaging system may be provided with an attachment/detachment determination unit that determines whether the imaging device and the information processing device are in an attachment status or in an detachment status and outputs the attachment/detachment information. For example, the imaging device 20 may be provided with an attachment/detachment determination unit 91 as shown in the part (B) of FIG. 1, or the information processing device 60 may be provided with the attachment/detachment unit 91 as shown in the part (C) of FIG. 1. Furthermore, an adaptor, which is used to attach the imaging device and the information processing device to each other, may be configured to include the attachment/detachment determination unit 91. In addition, the attachment/detachment determination unit 91 may be provided in a device other than the device that includes the controller having the function of performing the status control. For example, like the imaging system 10 shown in the part (B) of FIG. 1, in the case when the controller 45 in the imaging device 20 is allowed to have the function of performing the status control, the information processing device 60 may be provided with the attachment/detachment determination unit 91. Furthermore, although not shown, the controller or the attachment/detachment determination unit may be provided independently of the imaging device 20 or the information processing device 60.

The imaging device 20 is configured so that its status may be controlled, for example, to perform generation of a desired captured image (a still or moving image). In addition, the imaging device 20 has a communication function. The imaging device 20 communicates with the information processing device 60 to exchange various types of information between each other, for example, through wireless communication. In addition, the imaging device 20 is not equipped with a function of displaying the captured image that is generated by imaging, but the imaging device 20 transmits image information of the captured image to the information processing device for displaying the captured image. Furthermore, the imaging device 20 is configured so that its status may be controlled based on a control signal supplied from the information processing device 60 through communication. The imaging device 20 may be provided with a function of displaying the captured image or outputting sound at the time of shooting.

The information processing device 60 is equipment having a display function and a communication function, and examples of the information processing device can include a mobile phone, a smartphone, a tablet terminal, a notebook computer, or the like. The information processing device 60 performs, for example, a process on the information supplied from the imaging device 20 through wireless communication. For example, the information processing device 60 displays the captured image based on the image information supplied from the imaging device 20. In addition, the information processing device 60, when performing the status control of the imaging device 20, generates a control signal used to control the imaging device 20 and transmits it to the imaging device 20 through communication.

The imaging system 10 is not limited to the configuration illustrated in FIG. 1. For example, the imaging system 10 may be configured to include only a single controller 15, only a single imaging device 20, only a single information processing device 60, or any combination of them.

<2. Appearance of Imaging System>

Figure 2:
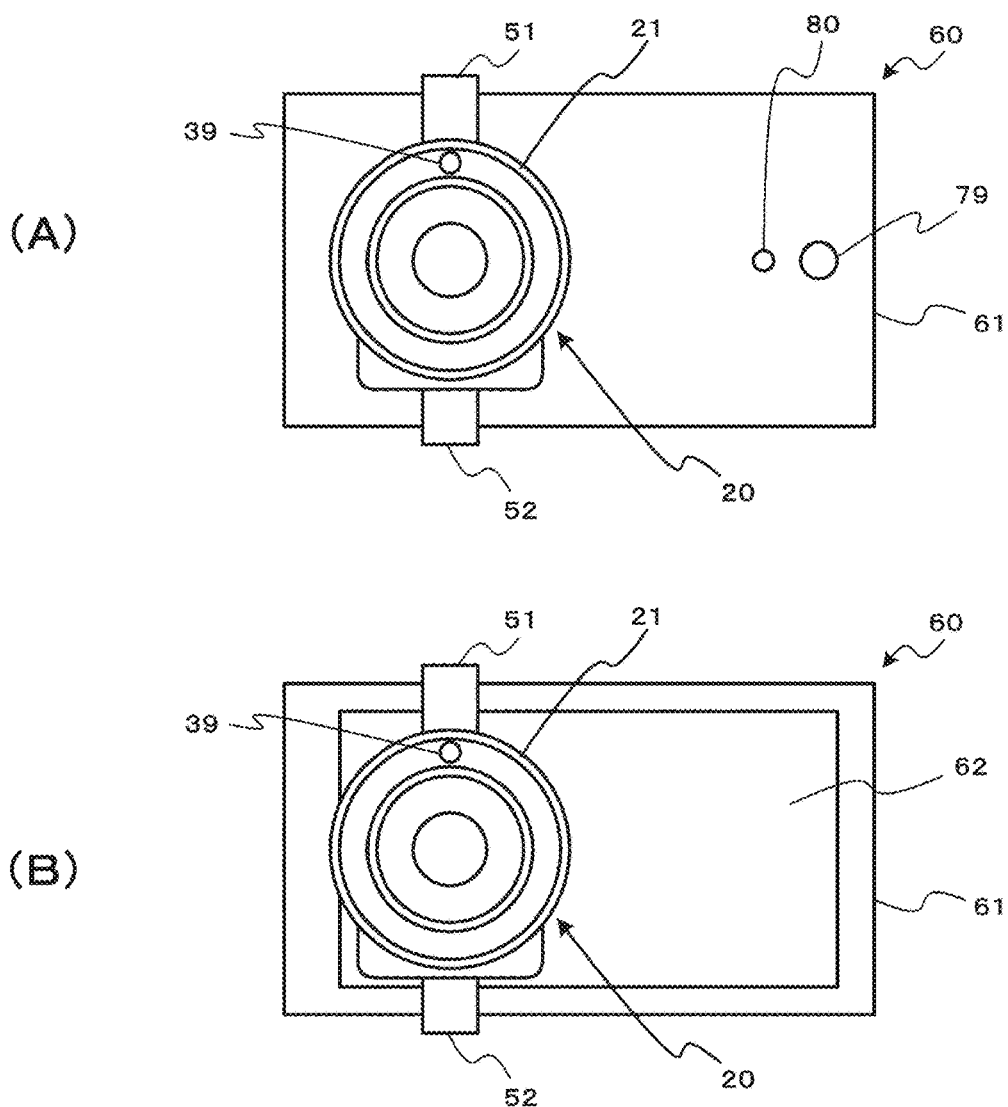
FIG. 2 is a diagram illustrating the appearance configuration of the imaging system.
Figure 3:
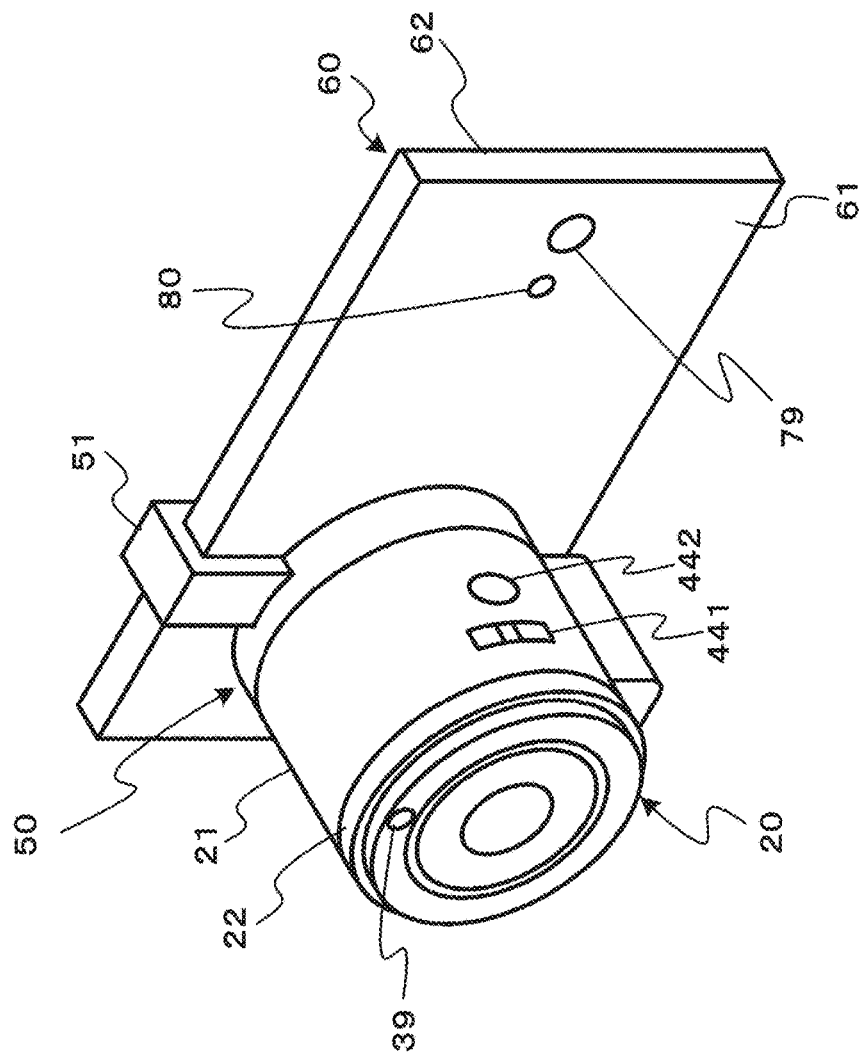
FIG. 3 is a perspective view illustrating the appearance configuration of the imaging system.

FIGS. 2 and 3 are perspective views illustrating the appearance configuration of the imaging system. FIG. 4 is a front and side view of the imaging device. In FIGS. 2 and 3, for example, a smartphone is used as the information processing device.

The imaging device 20 is configured to include, although not shown, an imaging optical system, an imaging unit, a signal processing unit, a communication unit, a controller, or the like in an outer cylindrical portion 21 that is formed in a cylindrical shape. The outer cylindrical portion 21 includes an annular control ring 22 provided at the front end of the outer cylindrical portion 21. The imaging optical system may be an interchangeable lens. The imaging device 20 changes the focus position or zoom position with the rotation of the control ring 22. Thus, the use of the control ring 22 allows operations such as focus adjustment to be performed manually. In addition, the outer cylindrical portion 21 includes a zoom button 441 and a shutter button 442, which are provided on the side face of the outer cylindrical portion 21. The imaging device 20 changes the zoom position to the wide-angle side or the telephoto side in response to the operation of the zoom button 441. In addition, the imaging device 20, in the still image mode, performs a process of recording a still image, which is obtained when the user operates the shutter button 442, on a recording medium. Furthermore, the imaging device 20, in the moving-image imaging mode, starts or ends the recording of the moving image in response to the operation of the shutter button 442.

The information processing device 60 is configured to include, although not shown, a signal processing unit, a communication unit, a controller, or the like in an outer casing 61 that is formed in the substantially rectangular case shape. In addition, the outer casing 61 includes a display panel 62 on a face (surface) of the outer casing 61. The display panel 62 is constructed using a touch panel. Predetermined respective positions of the display panel 62 are operated to execute various functions.

The imaging device 20 is provided with a mounting mechanical portion 50 used to allow the imaging device 20 to be integrally mounted on the information processing device 60. The mounting mechanical portion 50 includes mounting members 51 and 52 provided on the mounting mechanical portion 50 and is configured to be movable in the direction of the arrow FA as shown in FIG. 4. The user moves the mounting members 51 and 52 in the direction of the arrow FA to engage with the outer casing 61 of the information processing device 60 depending on the shape, size, or the like of the information processing device 60, and thus the imaging device 20 is attached to the information processing device 60. The part (A) of FIG. 2 illustrates the status where the imaging device 20 is integrally attached to the backside of the information processing device 60. The part (B) of FIG. 2 illustrates the status where the imaging device 20 is integrally attached to the front side (the side of the display panel 62) of the information processing device 60. In addition, the user detaches the imaging device 20 from the information processing device 60 by moving the mounting members 51 and 52, which engage with the outer casing 61 of the information processing device 60, in the opposite direction to the engagement direction.

The mounting mechanical portion 50 is not limited to the case in which it is configured integrally with the imaging device 20, and may be configured separately from the imaging device 20 as an adaptor for integrally mounting the imaging device 20 and the information processing device 60.

<3. Functional Configuration of Imaging Device>

Figure 5:
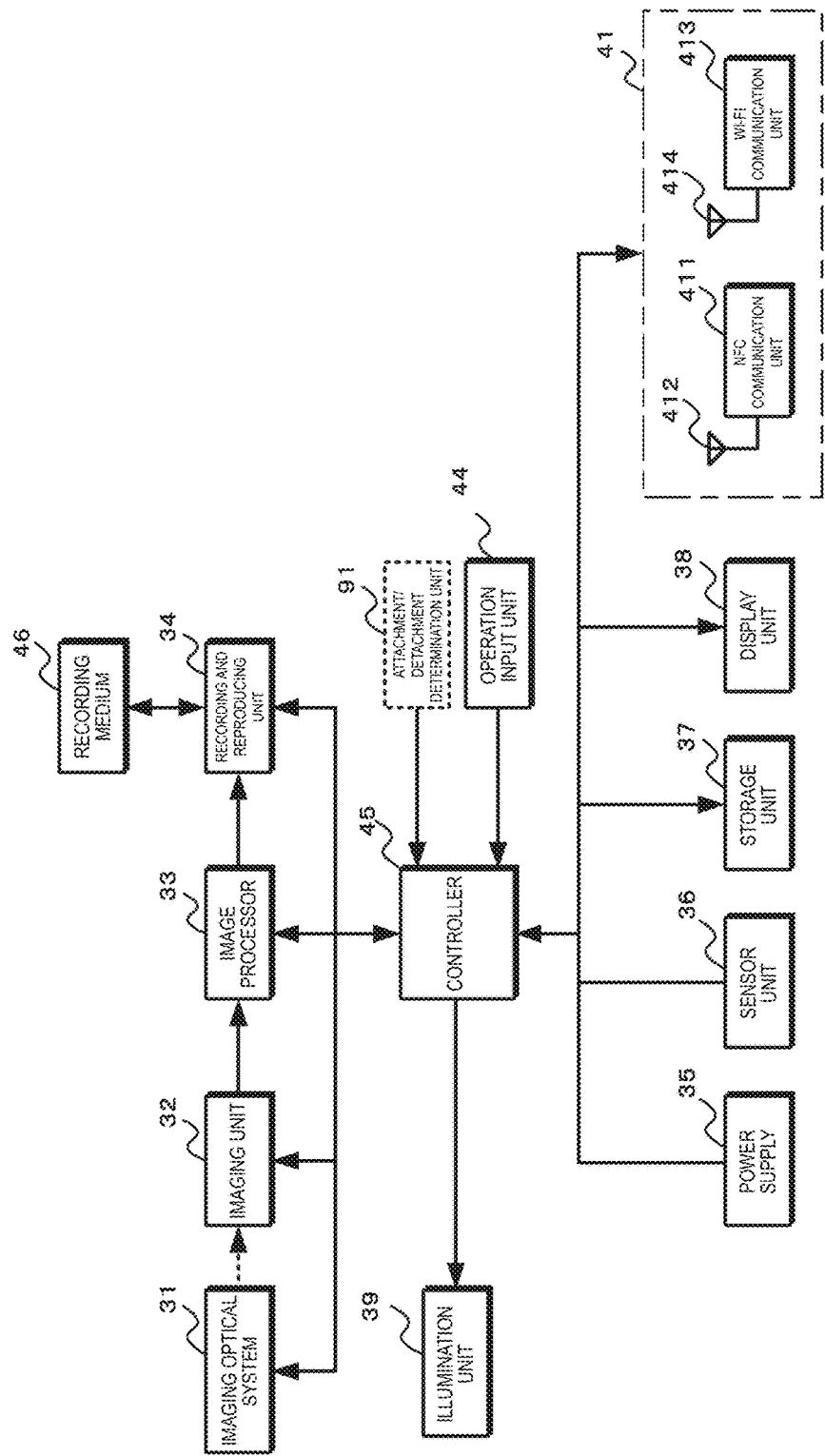
FIG. 5 is a block diagram illustrating the functional configuration of the imaging device.

The functional configuration of the imaging device will be described below. FIG. 5 is a block diagram illustrating the functional configuration of the imaging device.

The imaging device 20 is configured to include an imaging optical system 31, an imaging unit 32, an image processor 33, a recording and reproducing unit 34, a power supply 35, a sensor unit 36, a storage unit 37, a display unit 38, an illumination unit 39, a wireless communication unit 41, an operation input unit 44, and a controller 45. In addition, the imaging device 20 is provided with a recording medium 46. The recording medium 46 may be fixed to the imaging device 20 or may be mounted on the imaging device 20 in a removable manner.

The imaging optical system 31 is configured to include a lens group composed of a focus lens, zoom lens, or the like, an iris adjustment mechanism, and a driver used to drive the lens group or the iris adjustment mechanism. In addition, the imaging optical system 31 may be configured to include an optical shutter mechanism, an image stabilization mechanism, or the like.

The imaging unit 32 is constructed using an imager such as a charge-coupled device (CCD) or a complementary metal oxide semiconductor (CMOS). The imaging unit 32 converts an optical image of the subject that is created by the imaging optical system 31 into an image signal. The imaging unit 32 outputs the image signal generated by photoelectric conversion to the image processor 33.

The image processor 33 performs various signal processes on the image signal outputted from the imaging unit 32. For example, the image processor 33 performs noise reduction, color tone compensation, edge detection, or the like as necessary. The image processor 33 output the processed image signal to the recording and reproducing unit 34.

The recording and reproducing unit 34 records a captured image and reproduces the recorded captured image using the recording medium 46. The recording and reproducing unit 34 records the image signal of a still image or moving image, which is generated by the imaging unit 32 and is processed by the image processor 33, on the recording medium 46. In addition, the recording and reproducing unit 34 reproduces the still image or moving image recorded on the recording medium 46 and reads out the image signal. The recording and reproducing unit 34 may record an image signal before being subjected to processing by the image processor 33 on the recording medium 46. In addition, the recording and reproducing unit 34 may be configured to perform an encoding process for compressing the amount of signals of the image signal to be recorded on the recording medium 46 and a decoding process for decoding the coded data recorded on the recording medium 46.

The power supply 35 is configured to include a battery and a power supply circuit. The power supply 35 supplies power to each component of the imaging device 20 depending on the control signal outputted from the controller 45.

The sensor unit 36 detects the current position, posture or posture change, orientation, and so on of the imaging device 20. The sensor unit 36 is constructed using a sensor for detecting the current position, a sensor for detecting the posture or posture change, and a sensor for detecting the orientation of shooting direction, or the like, and outputs sensor information that indicates a result obtained by the detection to the controller 45. For example, the sensor unit 36 performs detection on the posture, such as an inclination of the imaging device 20 with respect to the vertical or horizontal direction, the position of the imaging device 20 in the rotation direction when the optical axis of the imaging optical system 31 is set as a rotation axis or the like. In addition, the sensor unit 36 detects a change in posture of the imaging device 20 or the like. Furthermore, when the sensor information is outputted together with the image information of the captured image to the information processing device 60, it is possible to display the captured image on the information processing device 60 in consideration of the posture or the like of the imaging device 20. For example, when a captured image is generated while the imaging device 20 is inclined with respect to the horizontal direction, the information processing device 60 corrects the inclination of the imaging device 20 based on the sensor information to display the image. When the image is displayed as described above, it is possible to prevent a subject having no inclination with respect to the horizontal direction from being displayed as if it is inclined. The sensor unit 36 uses, for example, a global positioning system (GPS) positioning module or the like as the sensor for detecting the current position. In addition, the sensor unit 36 uses, for example, a three-axis acceleration sensor, an inclination sensor, a gyro sensor, or the like as the sensor for detecting the posture or posture change, and uses, for example, a geomagnetic sensor or the like as the sensor for detecting the orientation of shooting direction. In addition, the sensor unit 36 may be configured to detect at least any one of the current position, the posture or posture change, and the orientation of the imaging device 20.

The storage unit 37 is a recording medium such as random access memory (RAM) and read-only memory (ROM). The RAM is used, for example, as a working area of the controller 45. In addition, the ROM stores, for example, programs or the like used to allow the controller 45 to execute various control operations. In addition, the ROM or RAM stores, for example, control information or the like used to allow the controller 45 to execute various control operations.

The display unit 38 is constructed using, for example, a liquid crystal display, and displays the setting status or operating status of the imaging device 20.

The illumination unit 39 emits illumination light to the subject to obtain a captured image with desired brightness based on a control signal from the controller 45.

The wireless communication unit 41 is configured to include a near field communication (NFC) communication unit 411, an NFC antenna 412, a Wi-Fi communication unit 413, and a Wi-Fi antenna 414.

The NFC communication unit 411 is an interface enabling contactless communication with an adjacent external device (e.g. the information processing device 60) in conjunction with the NFC antenna 412 under the control of the controller 45. The NFC communication unit 411 transmits a radio wave that reaches a short distance of approximately 3 cm to 10 cm from the NFC antenna 412 or approximately 7 mm depending on the design, and performs NFC based communication with an external device within the coverage area. The NFC communication unit 411 transmits, for example, connection information (Wi-Fi Configuration) or an android application record (AAR) for enabling the Wi-Fi auto connect in response to the check command from an external device. The connection information includes a service set identifier (SSID), passkey (encryption key), or the like for enabling the Wi-Fi connection.

The Wi-Fi communication unit 413 is an interface enabling wireless communication with a neighboring external device (e.g. the information processing device 60) in conjunction with the Wi-Fi antenna 414 under the control of the controller 45. The Wi-Fi communication unit 413 performs a Wi-Fi authentication and establishes a Wi-Fi communication connection with an external device, for example, in response to a Wi-Fi connection request from the external device.

The operation input unit 44 detects an operation inputted by the user and outputs an operation signal corresponding to the user operation to the controller 45. The operation input unit 44 includes the zoom button 441 or the shutter button 442 described above, and a corresponding function is previously assigned to such a physical switch.

The controller 45 executes a program recorded in the storage unit 37 and generates a control signal based on an operation signal supplied from the operation input unit 44, control information stored in the storage unit 37, a result obtained by communication with the information processing device 60, attachment/detachment information, sensor information, or the like. The controller 45 outputs the generated control signal to each component and performs imaging control, image processing control, recording and reproducing control, or the like so that an operation corresponding to the user operation may be performed in the imaging device 20. In addition, the controller 45 performs a process of transmitting image information of a captured image via the wireless communication unit 41 to the information processing device 60 or a process of controlling the operation of the imaging device 20 based on the control signal from the information processing device 60.

The recording medium 46 includes, for example, a memory card in which a captured image is written, and is mounted in a removable manner.

When the imaging device 20 is provided with the attachment/detachment determination unit 91, the attachment/detachment information to be outputted from the attachment/detachment determination unit 91 is outputted to the controller 85 of the information processing device 60 via the controller 45 or the wireless communication unit 41. In addition, the processing to be performed by the attachment/detachment determination unit 91 may be performed by the controller 45.

When the imaging device 20 is provided with the attachment/detachment determination unit 91, the imaging device 20 is provided, as the attachment/detachment determination unit 91, with a switch used to detect whether it is in attachment status or in detachment status, and a signal generated by the switch is used as the attachment/detachment information. For example, when the imaging device 20 is in the status where it can be detached from the mounting mechanical portion 50, the imaging device 20 is provided with a switch, which is turned on when the mounting mechanical portion 50 is mounted on the imaging device 20 and is further mounted on the information processing device 60 and is turned off when any of them are detached, as the attachment/detachment determination unit 91. In addition, a signal generated by the switch is used as the attachment/detachment information.

<4. Functional Configuration of Information Processing Device>

Figure 6:
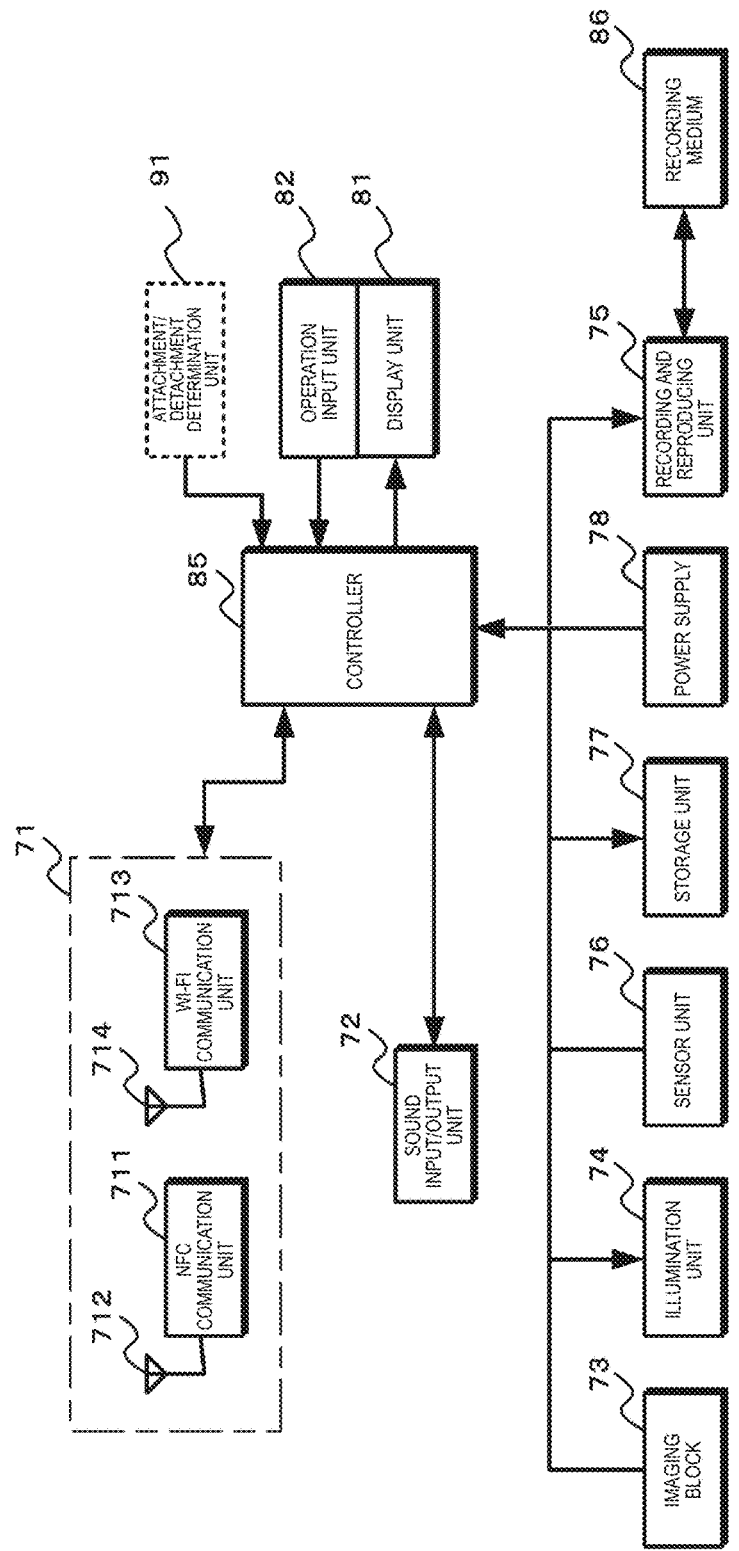
FIG. 6 is a block diagram illustrating the functional configuration of an information processing device (e.g. smartphone).

The functional configuration of the information processing device will be described below. FIG. 6 is a block diagram illustrating the functional configuration of the information processing device (e.g. smartphone).

The information processing device 60 is configured to include a wireless communication unit, a sound input/output unit 72, an imaging block 73, an illumination unit 74, a recording and reproducing unit 75, a sensor 76, a storage unit 77, a power supply 78, a display unit 81, an operation input unit 82, and a controller 85. In addition, the information processing device 60 includes a recording medium 86 mounted thereon in a removable manner.

The wireless communication unit 71 is configured to include an NFC communication unit 711, an NFC antenna 712, a Wi-Fi communication unit 713, and a Wi-Fi antenna 714. The wireless communication unit 71 may be provided with a communication unit, although not shown, that conforms to the cellular communication standard.

The NFC communication unit 711 is an interface enabling contactless communication with an adjacent external device (e.g. the imaging device 20) in conjunction with the NFC antenna 712 under the control of the controller 85. The NFC communication unit 711 performs, for example, NFC communication with the imaging device 20 as described above.

The Wi-Fi communication unit 713 is an interface enabling wireless communication with a neighboring external device (e.g. the imaging device 20) in conjunction with the Wi-Fi antenna 714 under the control of the controller 85. The Wi-Fi communication unit 713 establishes, for example, a Wi-Fi communication connection with the imaging device 20 as described above.

The sound input/output unit 72 is constructed using a speaker and a microphone. The sound input/output unit 72 performs sound input and output of the voice communication performed via the wireless communication unit 71. In addition, the sound input/output unit 72 outputs the reproduced sound of the music content or image content recorded in the storage unit 77 or the recording medium 86. In addition, the sound input/output unit 72 outputs the operation sound in response to a user operation performed on the operation input unit 82.

The imaging block 73 is configured to include an imaging optical system, an imager such as charge-coupled device (CCD) or complementary metal oxide semiconductor (CMOS), a driver for driving the imaging optical system and the imager, or the like. The imaging block 73 generates image information of a captured image.

The illumination unit 74 emits illumination light to the subject to obtain a captured image with desired brightness based on a control signal from the controller 85.

The recording and reproducing unit 75 records various information and reads recorded information using the recording medium 86. The recording and reproducing unit 75 records, for example, music content, image content, captured image, mail information, address information of others used in wireless communication, or the like on the recording medium 86. In addition, the recording and reproducing unit 75 reads various information recorded on the recording medium.

The sensor 76 detects the current position, posture or posture change, orientation, and so on of the information processing device 60. The sensor 76 is constructed with a sensor for detecting the current position, a sensor for detecting the posture or posture change, and a sensor for detecting the orientation of shooting direction, or the like, and outputs sensor information that indicates a result obtained by the detection to the controller 85. The sensor 76 uses, for example, a global positioning system (GPS) positioning module or the like as the sensor for detecting the current position. In addition, the sensor 76 uses, for example, a three-axis acceleration sensor, an inclination sensor, a gyro sensor, or the like as the sensor for detecting the posture or posture change, and uses, for example, a geomagnetic sensor or the like as the sensor for detecting the orientation of shooting direction. In addition, the sensor 76 may be configured to detect at least any one of the current position, the posture or posture change, and the orientation of the information processing device 60.

The storage unit 77 is a recording medium such as random access memory (RAM) and read-only memory (ROM). The RAM is used, for example, as a working area of the controller 85. In addition, the ROM stores, for example, programs or the like used to allow the controller 85 to execute various control operations. In addition, the ROM or RAM stores, for example, control information or the like used to allow the controller 85 to execute various control operations. Furthermore, the RAM can be configured to record music content, image content, programs of various applications, a captured image supplied from the imaging device 20, mail information, or the like.

The power supply 78 is configured to include a battery and a power supply circuit. The power supply 78 supplies power to each component of the information processing device 60 based on the control signal outputted from the controller 85.

The display unit 81 is constructed using a display element such as a liquid crystal display or organic EL display. The display unit 81 displays a graphical user interface (GUI) screen, a text, image, or the like depending on the operation of an application.

The operation input unit 82 is constructed using an operation switch or a touch panel. The touch panel is provided on a display screen of the display unit 81, and a function corresponding to display on the display screen is assigned to the touch panel. The operation input unit 82 generates an operation signal corresponding to the user operation and outputs it to the controller 85. The display panel 62 described above is configured to include, for example, the display unit 81 and the operation input unit 82.

The controller 85 executes a program recorded in the storage unit 77 and generates a control signal based on an operation signal supplied from the operation input unit 82, control information stored in the storage unit 77, or the like. The controller 85 outputs the generated control signal to each component and performs communication control, display control, recording and reproducing control, or the like so that an operation corresponding to the user operation may be performed in the information processing device 60. In addition, the controller 85 controls the NFC communication unit 711 and the Wi-Fi communication unit 713 to perform wireless communication with the imaging device 20. In addition, the controller 85 performs a process of starting a predetermined application program based on the communication with the imaging device 20, and the controller 85 performs a process of generating a control signal based on the operation signal, the attachment/detachment information, attachment relationship information, or the like and transmitting it to the imaging device 20 after the program is started. Furthermore, the controller 85 performs, for example, a process of allowing the display unit 81 to display a captured image supplied from the imaging device 20, a process of allowing the sound input/output unit 72 to output operation sound in response to the user operation.

When the information processing device 60 is provided with the attachment/detachment determination unit 91, the attachment/detachment information outputted from the attachment/detachment determination unit 91 is outputted to the controller 45 of the imaging device 20 via the controller 85 or the wireless communication unit 71. In addition, the processing performed by the attachment/detachment determination unit 91 may be performed by the controller 85.

In addition, when the attachment/detachment determination unit 91 is provided in an adaptor that is used to attach the imaging device 20 to the information processing device 60, the attachment/detachment determination unit 91 outputs a result obtained by the determination to the controller 45 of the imaging device 20 or the controller 85 of the information processing device 60.

When the information processing device 60 is provided with an attachment/detachment determination unit, the information processing device 60 is provided with, as the attachment/detachment determination unit 91, a detection mechanism or detection function for detecting whether the mounting members 51 and 52 of the mounting mechanical portion 50, which is mounted on the imaging device 20 to attach the imaging device 20 to the information processing device 60, are engaged with the information processing device 60. In addition, the attachment/detachment determination unit 91 regards the detection result obtained by the detection mechanism or the like as the attachment/detachment information. A switch that functions as the detection mechanism may be provided in the information processing device 60, or the display panel 62 may be used to achieve the detection function. When the mounting mechanical portion 50 that serves as an adaptor is provided with the attachment/detachment determination unit 91, the mounting mechanical portion 50 is provided with, as the attachment/detachment determination unit 91, a detection mechanism for detecting whether mounting members, which are used to attach the mounting mechanical portion 50 mounted on the imaging device 20 to the information processing device 60, are engaged with the information processing device 60. The attachment/detachment determination unit 91 regards the detection result obtained by the detection mechanism or the like as the attachment/detachment information. In addition, in the attachment status, the attachment/detachment information may be generated by determining whether the imaging device 20 and the information processing device 60 are in the attachment status or in the detachment status based on the detection result of the posture change or movement of the imaging device 20 and the information processing device 60 from the fact that the posture change or movement of the imaging device 20 and the information processing device 60 are coincident with each other.

<5. Operation by Imaging System>

[5-1. Association Between Imaging Device and Information Processing Device]

Figure 7:
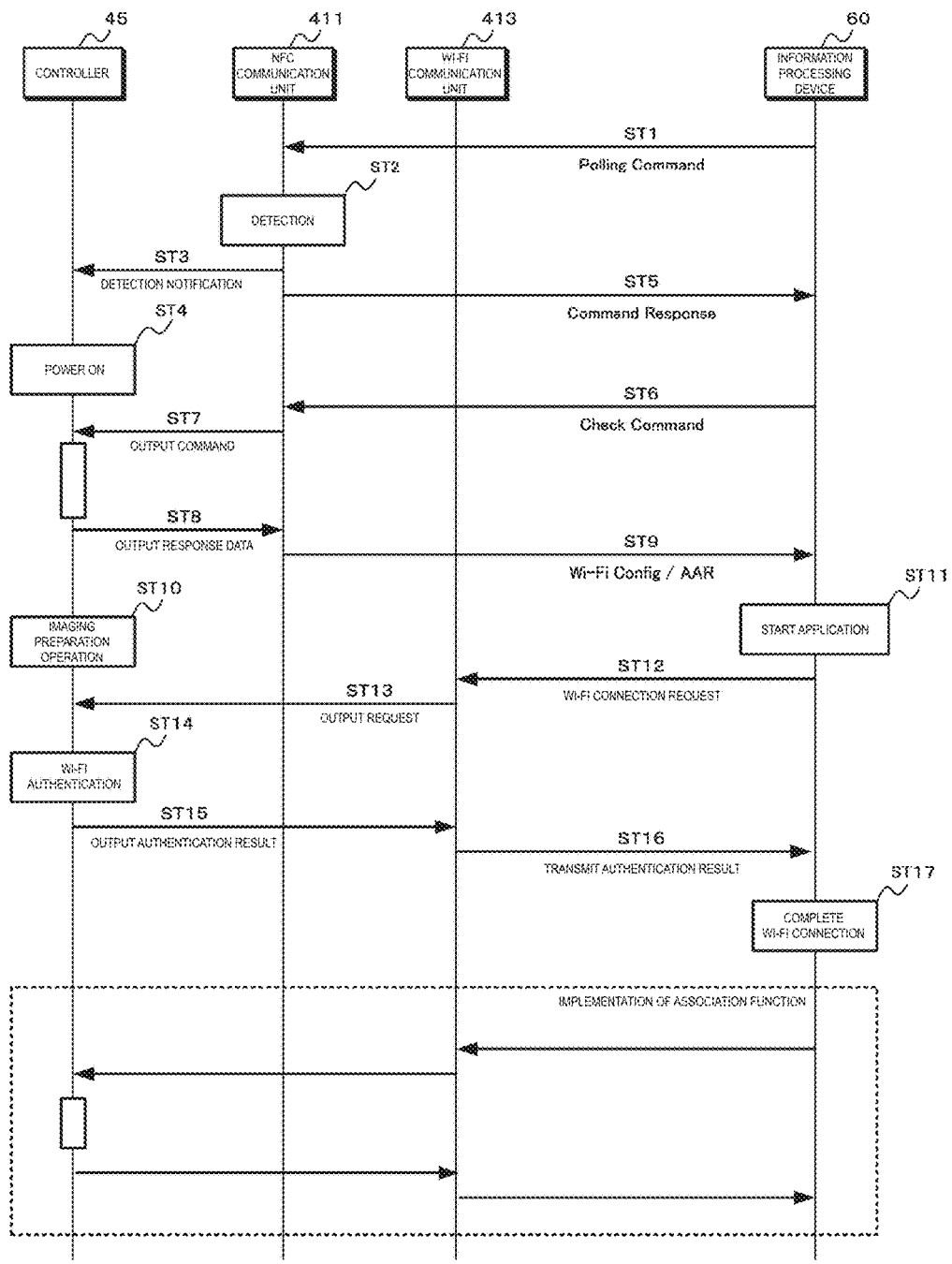
FIG. 7 is a sequence diagram illustrating an operation process until the association function between the imaging device and the information processing device is started.

The operation performed by the imaging system will be described below. FIG. 7 is a sequence diagram illustrating an operation process until the association function between the imaging device and the information processing device is started in the imaging system.

In step ST1, the information processing device 60 transmits the polling command through NFC communication. In this regard, when a NFC antenna of the imaging device 20 is placed within the predetermined coverage area from the NFC antenna of the information processing device 60, the NFC communication unit 411 detects that the polling command is transmitted in step ST2.

In step ST3, the NFC communication unit 411 of the imaging device 20 notifies the controller 45 that the NFC communication from the information processing device 60 is detected.

In step ST4, the controller 45 generates a control signal and outputs it to the power supply 35 to control the power supply to turn the power on depending on the detection notification from the NFC communication unit 411.

In step ST5, the NFC communication unit 411 transmits the command response through NFC communication in response to the detection of NFC communication.

In step ST6, the information processing device 60 detects the command response from the imaging device 20 and recognizes the opposite party of NFC communication. Then, the information processing device 60 transmits the check command to acquire predetermined information.

In step ST7, the NFC communication unit 411 of the imaging device 20 outputs the check command received through NFC communication to the controller 45.

In step ST8, the controller 45 outputs response data to the NFC communication unit 411 in response to the check command. In this regard, the response data includes, for example, the Wi-Fi Configuration and AAR described above.

In step ST9, the NFC communication unit 411 transmits the response data to the information processing device 60 through NFC communication. Steps ST6 to ST9 described above are performed a plurality of times, and the response data may be transmitted several times.

In step ST10, the controller 45 performs an imaging preparation operation. The controller 45 performs the preparation operation so that the imaging device 20 is ready to capture an image. In addition, in this preparatory operation, a preparation operation capable of recognizing that the imaging device 20 is ready to capture an image may be performed. For example, when a retractable lens is used as the imaging optical system 31, the controller 45 performs an operation of extending the lens, an operation of outputting start-up sound, or the like. The imaging preparation operation may be performed after Wi-Fi connection is completed.

In step ST11, the information processing device 60 starts a predetermined application in accordance with the received AAR. For example, in the predetermined application, a process of receiving an image signal of a captured image transmitted through Wi-Fi communication from the imaging device 20 and displaying the captured image is performed.

In step ST12, the information processing device 60 transmits a Wi-Fi connection request to the imaging device 20 using the received Wi-Fi Config.

In step ST13, the Wi-Fi communication unit 413 of the imaging device 20 outputs the connection request received from the information processing device 60 to the controller 45.

In step ST14, the controller 45 performs Wi-Fi authentication. The Wi-Fi authentication may be performed in the Wi-Fi communication unit 413.

In step ST15, the controller 45 outputs a result obtained by the authentication to the Wi-Fi communication unit 413.

In step ST16, the Wi-Fi communication unit 413 transmits the authentication result to the information processing device 60. In step ST17, the information processing device 60 completes the Wi-Fi connection if the authentication is successful. Then, the imaging device 20 and the information processing device 60 implement the association function using Wi-Fi communication.

The process to implement the association function between the imaging device 20 and the information processing device 60 is not limited to the process procedure illustrated in FIG. 7, as long as the imaging device 20 and the information processing device 60 are associated through Wi-Fi communication or the like.

[5-2. Status Control]

The status control of the imaging device or the information processing device will be described below. The imaging device 20 and the information processing device 60 are operable by being integrally attached to each other through the above-described mounting mechanical portion 50 as shown in the part (A) of FIG. 8. In addition, the imaging device 20 and the information processing device 60 are operable even in the status where the attachment status is released and then detached from each other as shown in the part (B) of FIG. 8. After the association function is implemented, the imaging device 20 or the information processing device 60 configured as described above performs the status control of the imaging device 20 or the status control of the information processing device 60 depending on the attachment/detachment information indicating whether they are in the attachment status in which the imaging device 20 and the information processing device 60 are attached to each other or in the detachment status in which they are detached from each other. In addition, as the status control, the status control corresponding to the detachment status or the status control corresponding to the attachment status is performed depending on the attachment/detachment information, for example, an operation to be limited to a predetermined function depending on the attachment/detachment information is performed. The operation to be limited to a predetermined function includes an operation of an automatic transition from another function to the predetermined function, an operation of prohibiting the predetermined function from making a transition to the other function, or an operation of enabling only the predetermined function and automatically disabling the other function. Furthermore, the operation to be limited to a predetermined function may include an operation of notifying the user that the predetermined function is preferable, an operation of disabling the user's instruction to make a transition from the predetermined function to the other function, or the like. The predetermined function is not limited to a function that is registered in advance, and may be a function that is set by the user. In addition, examples of the operation of informing the user that the predetermined function is preferable include a display of "Recommended setting: autofocus mode" on a display unit and a notification using sound.

Thus, the status control of the imaging device 20 or the status control of the information processing device 60 performed depending on the attachment/detachment information eliminates the necessity of setting the status of the imaging device 20 or the status of the information processing device 60 each time the mode of use is changed, thereby improving the user interface.

In the status control of the imaging device 20, for example, a function that influences the status of a captured image is controlled or a function that influences the power consumption is controlled. In addition, in the status control of the information processing device 60, for example, a function that influences the imaging. Furthermore, in the status control of the imaging device 20 or the information processing device 60, a mode that is preset by the user may be set depending on the attachment/detachment information. The mode that is preset by the user may be a mode that is registered previously at factory shipment, a mode that is selected by the user, or a mode that is set uniquely by the user.

[5-2-1. First Status Control]

The description will be given of a first status control. There will be described a case where, in the first status control, as the status control of the imaging device 20, the status control of a function that influences the status of a captured image is performed, for example, the status control for autofocus of the imaging device is performed.

The imaging device and the information processing device are operable in any status of the attachment and detachment statuses as described above. In this regard, when the imaging device and the information processing device are in the detachment status and the imaging device is located away from the information processing device, it is difficult for the user to operate, for example, the control ring 22 provided in the imaging device 20. In addition, even when the imaging device 20 is held with one hand and the information processing device 60 is held with the other hand, it is difficult to operate the control ring 22. Accordingly, when the imaging device and the information processing device are in the detachment status, the manual operation of focusing operation is likely to be difficult, and thus the status control for limiting the focus function of the imaging device to the autofocus mode is performed. For example, in the status control to be limited to the autofocus mode, a control of an automatic transition to the autofocus mode when the focus mode is the manual focus mode, a control for notifying the user that the autofocus mode is preferable, or the like are performed. In addition, when the user presets the mode in which the focus function of the imaging device is limited to the autofocus mode and the imaging device and the information processing device are in the detachment status, the status control for limiting the focus function of the imaging device to the autofocus mode may be performed by setting to the preset mode.

Figure 9:
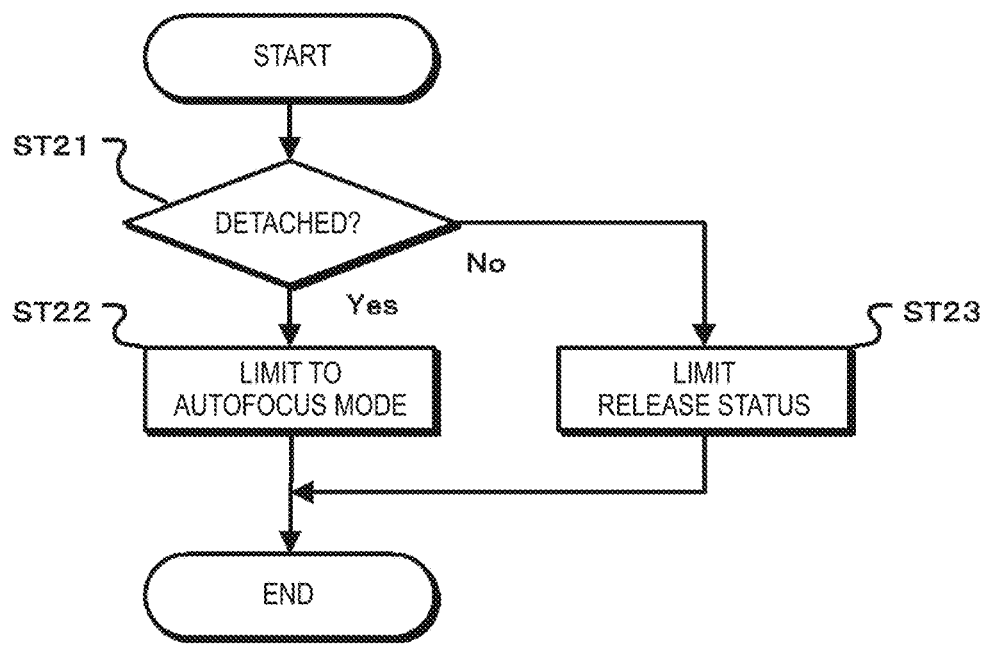
FIG. 9 is a flowchart illustrating a process in the case when a controller of the imaging device performs a first status control.

FIG. 9 is a flowchart illustrating a process in the case where the first status control is performed by the controller of the imaging device.

In step ST21, the controller 45 determines whether the imaging device 20 and the information processing device 60 are detached from each other. If the imaging device 20 and the information processing device 60 are determined by the controller 45 to be detached from each other based on the attachment/detachment information outputted from the attachment/detachment determination unit 91, the process proceeds to step ST22. If it is determined that they are in the attachment status, the process proceeds to step ST23.

In step ST22, the controller 45 performs the status control for limiting the focus function to the autofocus mode. When the imaging device 20 is set to the manual focus mode, the controller 45 switches the mode to the autofocus mode. In addition, the controller 45 limits the type of focus modes that can be selected by the imaging device 20 to the autofocus mode.

In step ST23, the controller 45 performs the status control for limiting the focus function to a limit release status. When the focus function of the imaging device 20 is limited to the autofocus mode, the controller 45 releases the limit, thereby enabling the manual focus mode to be selectable.

The status control of the imaging device 20 may be performed using not only the attachment/detachment information but also other information. For example, the imaging device 20 determines the separation distance from the information processing device 60 provided that the imaging device 20 is detached from the information processing device 60. When the separation distance is longer than a predetermined distance, the focus function may be limited to the autofocus mode.

In this case, it is preferable for the imaging device 20 to determine the separation distance, for example, based on the electric field intensity or propagation loss of the wireless signal from the information processing device 60, the amplification factor in the case of amplifying the received wireless signal to a desired signal level, the propagation time between the imaging device 20 and the information processing device 60, or the like.

In FIG. 9, the determination of whether detachment is occurred is performed in step ST21, but this step is not limited to such process, and other processes may be performed. For example, in step ST21 of FIG. 9, the controller 45 detects that the attachment/detachment information currently indicates the detachment status and performs the status control based on the detection result, instead of the determination of whether detachment is occurred. In addition, when the process described in the flowchart of FIG. 9 or flowcharts of FIGS. 10 to 19, and FIG. 21 described later is performed repeatedly at predetermined time intervals, the status control corresponding to the status after transition can be performed even when the imaging device 20 or the information processing device 60 makes a transition from the attachment status to the detachment status or a transition from the detachment status to the attachment status.

Figure 10:
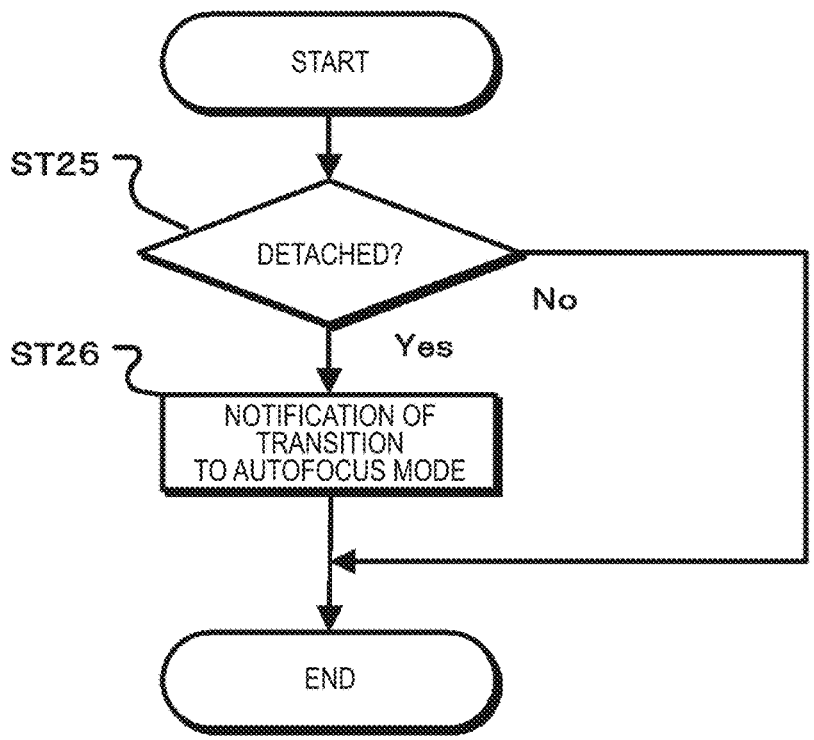
FIG. 10 is a flowchart illustrating another process in the case when the controller of the imaging device performs the first status control.

FIG. 10 is a flowchart illustrating another process in the case where the first status control is performed by the controller of the imaging device.

In step ST25, the controller 45 determines whether the imaging device 20 and the information processing device 60 are detached from each other. If the imaging device 20 and the information processing device 60 are determined by the controller 45 to be detached from each other based on the attachment/detachment information outputted from the attachment/detachment determination unit 91, the process proceeds to step ST26. If it is determined that they are in the attachment status, the process is terminated.

In step ST26, the controller 45 notifies the user the transition to the autofocus mode. When the imaging device 20 is set to the manual focus mode, the controller 45 notifies the user that the autofocus mode is preferable.

In this way, when the user selects the manual focus mode to capture an image, even if the imaging device 20 and the information processing device 60 are determined to be detached from each other, the automatic switching to the autofocus mode is not performed. Thus, the user can continue to capture the image in the manual focus mode unless the user switches the mode to the autofocus mode. Thus, it is possible to prevent the automatic switching of the focus mode against the user's intention. Even in the status control described later, by notifying the user that the transition to a specified status depending on the attachment/detachment information is preferable, the transition to the specified status may be performed in accordance with the instruction from the user.

Figure 11:
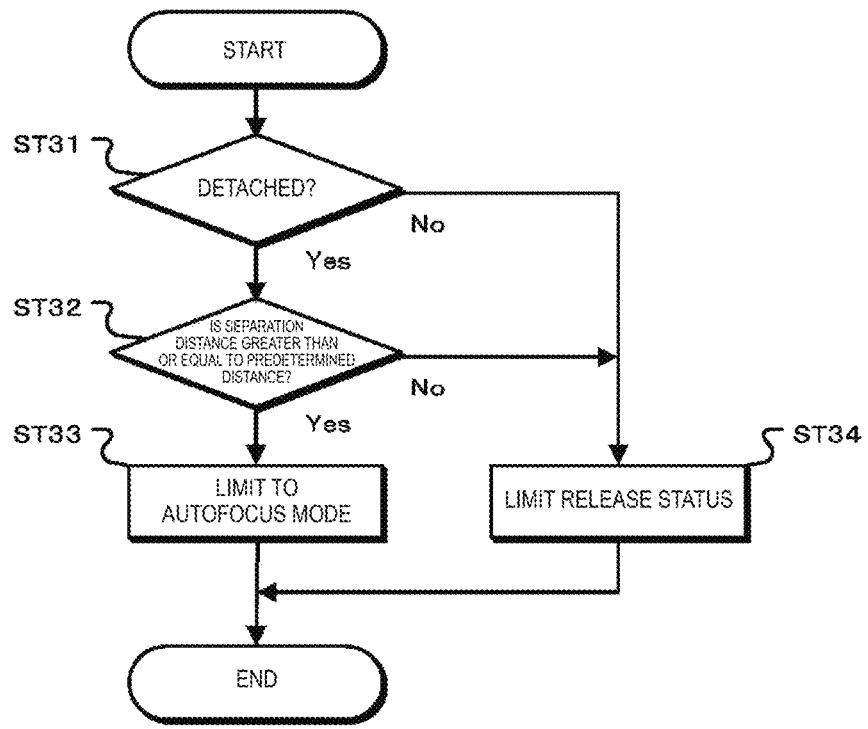
FIG. 11 is a flowchart illustrating another process in the case when the controller of the imaging device performs the first status control.

FIG. 11 is a flowchart illustrating another process in the case where the first status control is performed by the controller of the imaging device, and employs the separation distance.

In step ST31, the controller 45 determines whether the imaging device 20 and the information processing device 60 are detached from each other. If the imaging device 20 and the information processing device 60 are determined by the controller 45 to be detached from each other based on the attachment/detachment information outputted from the attachment/detachment determination unit 91, the process proceeds to step ST32. If it is determined that they are in the attachment status, the process proceeds to step ST34.

In step ST32, the controller 45 determines whether the separation distance between the imaging device 20 and the information processing device 60 is greater than or equal to a predetermined distance. If the separation distance is greater than or equal to the predetermined distance, that is, if the information processing device 60 is away from it by the predetermined distance, then the controller 45 causes the process to proceed to step ST33. If the information processing device 60 is closer to it than the predetermined distance, the process proceeds to step ST34.

In step ST33, the controller 45 performs the status control for limiting the focus function to the autofocus mode. When the imaging device 20 is set to the manual focus mode, the controller 45 switches the mode to the autofocus mode. In addition, the controller 45 limits the type of focus modes that can be selected by the imaging device 20 to the autofocus mode.

In step ST34, the controller 45 performs the status control for setting the focus function to a limit release status. When the focus function of the imaging device 20 is limited to the autofocus mode, the controller 45 releases the limit to make the manual focus mode selectable.

Such a limitation of the focus function in the case where the separation distance is greater than or equal to the predetermined distance allows the focus function to be prevented from being limited, for example, when the imaging device 20 and the information processing device 60 are in the detachment status and the control ring 22 of the imaging device 20 is placed in an operable position.

Figure 12:
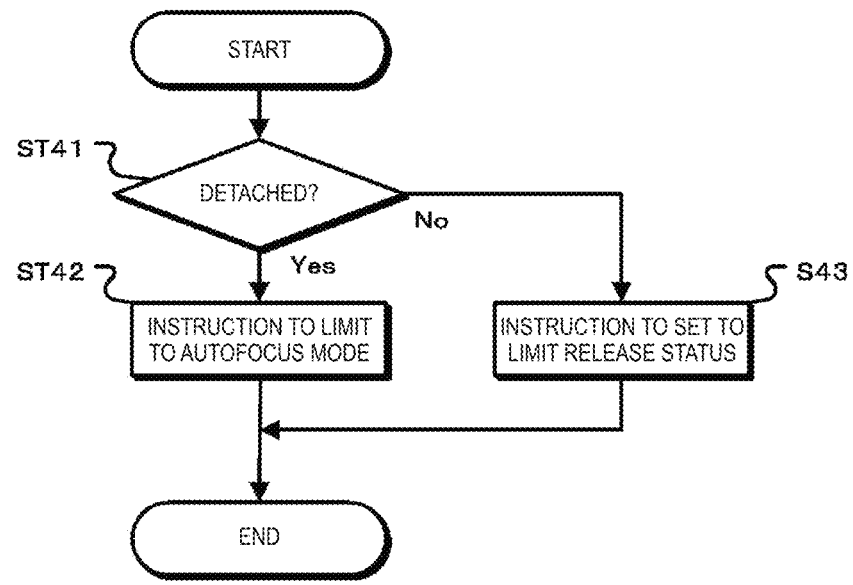
FIG. 12 is a flowchart illustrating a process in the case when a controller of the information processing device performs the first status control.

FIG. 12 is a flowchart illustrating a process in the case where the first status control is performed by the controller of the information processing device.

In step ST41, the controller 85 determines whether the imaging device 20 and the information processing device 60 are detached from each other. If the imaging device 20 and the information processing device 60 are determined by the controller 85 to be detached from each other based on the attachment/detachment information outputted from the attachment/detachment determination unit 91, the process proceeds to step ST42. If it is determined that they are in the attachment status, the process proceeds to step ST43.

In step ST42, the controller 85 issues an instruction to limit the focus function to the autofocus mode. The controller 85 supplies an instruction signal of the status control for limiting the focus function to the autofocus mode to the wireless communication unit 71 and causes the wireless communication unit 71 to transmit it as a wireless signal to the imaging device 20. When the wireless signal is received by the wireless communication unit 41 of the imaging device 20, the wireless communication unit 41 supplies the instruction signal obtained by receiving the wireless signal to the controller 45. When the focus function of the imaging device 20 is set to the manual focus mode, the controller 45 switches the mode to the autofocus mode based on the instruction signal. In addition, the imaging device 20 limits a selectable focus mode to the autofocus mode.

In step ST43, the controller 85 issues an instruction to set the focus function to the limit release status. The controller 85 supplies an instruction signal of the status control for setting the focus function to the limit release status to the wireless communication unit 71 and causes the wireless communication unit 71 to transmit it as a wireless signal to the imaging device 20. When the wireless signal is received by the wireless communication unit 41 of the imaging device 20, the wireless communication unit 41 supplies the instruction signal obtained by receiving the wireless signal to the controller 45. When the focus function of the imaging device 20 is limited to the autofocus mode, the controller 45 releases the limitation and makes the manual focus mode selectable based on the instruction signal.

In addition, even when the first status control is performed by the controller of the information processing device, the instruction to limit the focus function of the imaging device 20 may be issued depending on the separation distance between the imaging device 20 and the information processing device 60.

In this way, in the first status control, when the imaging device and the information processing device are determined to be attached to each other based on the attachment/detachment information or when the separation distance is determined to be greater than or equal to the predetermined distance in the detachment status, for example, the focus function is limited to the autofocus mode. Thus, when the imaging device 20 is used at a position away from the user holding the information processing device 60, it is possible to disable the mode that is difficult to be used by the user. In addition, the operation of limiting the focus function to the autofocus mode may include, but not limited to the operation of automatically disabling the mode that is difficult to be used by the user, the operation of notifying the user that the autofocus mode is preferable. Furthermore, the operation of prohibiting the transition from the autofocus mode to another mode or the operation that does not accept the user's instruction to make a transition from the autofocus mode to another mode may be performed.

The determination of whether they are detached is performed in step ST25 (step ST31 or ST41) of FIG. 10 (FIG. 11 or 12), but alternatively the detection of the attachment/detachment information currently indicating the detachment status and the status control based on the detection result may be performed instead of the determination of whether they are detached.

[5-2-2. Second Status Control]

The description will be given of a second status control. There will be described a case where, in the second status control, as the status control of the imaging device 20, the status control of a function that influences the status of a captured image and the status control of a function that influences power consumption is performed, for example, the status control for an illumination function of the imaging device is performed.

The imaging device and the information processing device are operable in any status of the attachment and detachment statuses as described above. In this regard, when the imaging device and the information processing device are in the detachment status, it is possible to obtain a subject captured image having desired brightness by using any one illumination unit provided in the imaging device and the information processing device. Thus, when the imaging device and the information processing device are in the attachment status, the status control for preventing the use of the illumination function of the imaging device is performed, for example, to reduce the power consumption of the imaging device. When the user previously sets the mode of preventing the user of the illumination function of the imaging device and the imaging device and the information processing device are in the attachment status, the setting of the mode that is preset allows the status control to be performed so that the use of the illumination function of the imaging device is prevented. Examples of the illumination function include a video light and strobe light.

Figure 13:
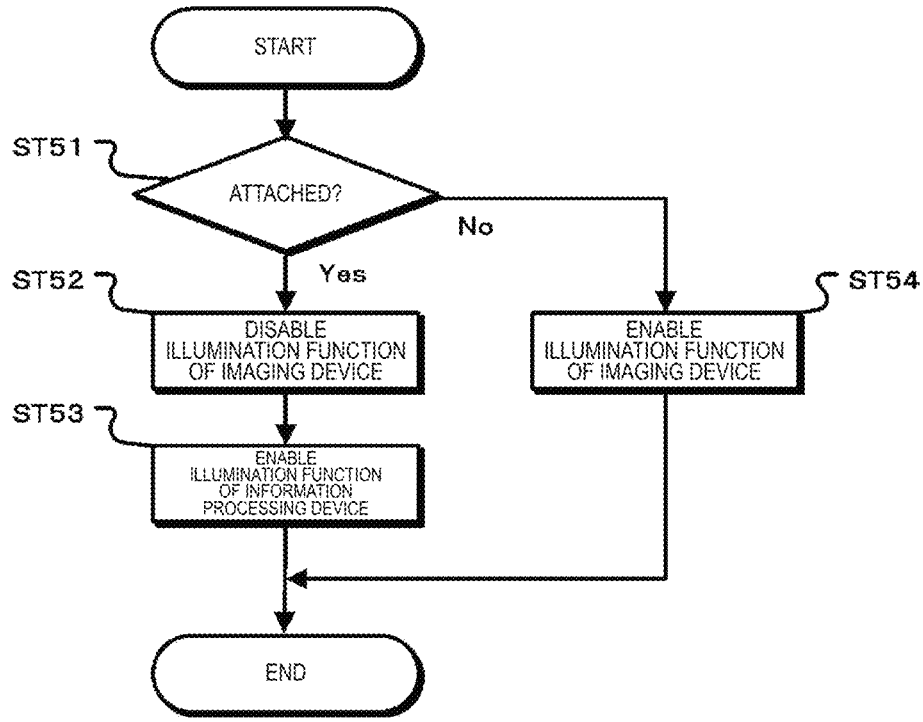
FIG. 13 is a flowchart illustrating a process in the case when the controller of the imaging device performs a second status control.

FIG. 13 is a flowchart illustrating a process in the case where the second status control is performed by the controller of the imaging device.

In step ST51, the controller 45 determines whether the imaging device 20 and the information processing device 60 are attached to each other. If the imaging device 20 and the information processing device 60 are determined by the controller 45 to be attached to each other based on the attachment/detachment information outputted from the attachment/detachment determination unit 91, the process proceeds to step ST52. If it is determined that they are in the detachment status, the process proceeds to step ST54.

In step ST52, the controller 45 performs the status control for disabling the illumination function of the imaging device 20. The controller 45 disables the function of the illumination unit 39. As one example, the controller 45 sets the imaging device 20 to off status when the illumination unit 39 is in on status, and then process proceeds to step ST53.

In step ST53, the controller 45 performs the status control for enabling the illumination function of the information processing device 60. The controller 45 performs control for enabling the function of the illumination unit 74 in the information processing device 60, and when, for example, it is determined to be necessary to use illumination during imaging, the illumination unit 74 of the information processing device 60 is set to on status to perform imaging.

In step ST54, the controller 45 performs status control for enabling the illumination function of the imaging device 20. The controller 45 enables the function of the illumination unit 39, and when, for example, it is determined to be necessary to use illumination during imaging, the illumination unit 39 of the image 20 is set to on status to perform imaging.

Figure 14:
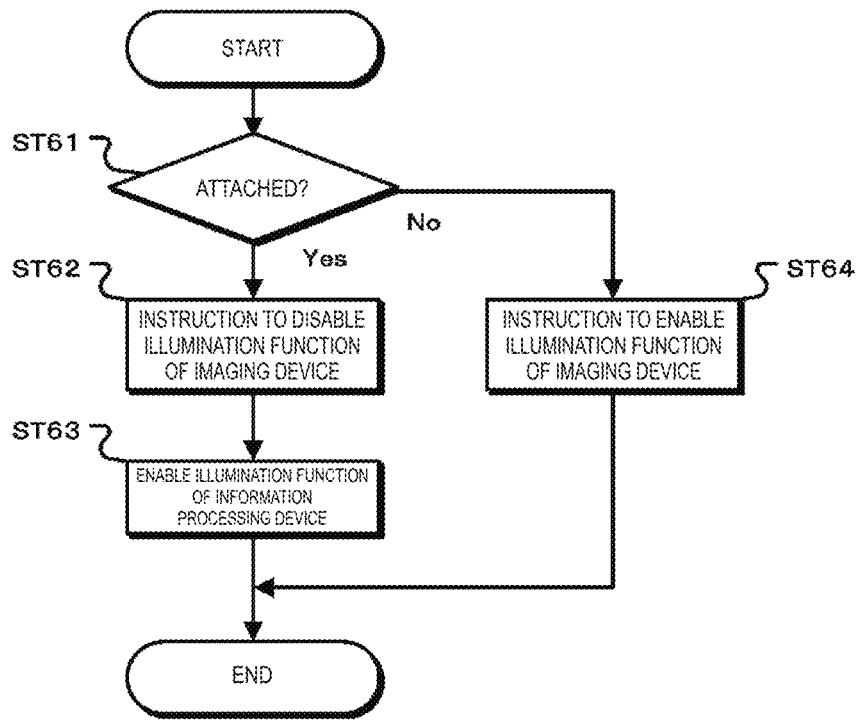
FIG. 14 is a flowchart illustrating a process in the case when the controller of the information processing device performs the second status control.

FIG. 14 is a flowchart illustrating a process in the case where the second status control is performed by the controller of the information processing device.

In step ST61, the controller 85 determines whether the imaging device 20 and the information processing device 60 are attached to each other. If the imaging device 20 and the information processing device 60 are determined by the controller 85 to be attached to each other based on the attachment/detachment information outputted from the attachment/detachment determination unit 91, the process proceeds to step ST62. If it is determined that they are in the detachment status, the process proceeds to step ST64.

In step ST62, the controller 85 issues an instruction to disable the illumination function of the imaging device 20. The controller 85 supplies an instruction signal of the status control for disabling the function of the illumination unit 39 in the imaging device 20 to the wireless communication unit 71 and causes the wireless communication unit 71 to transmit it as a wireless signal to the imaging device 20, and then process proceeds to step ST63. When the wireless signal is received by the wireless communication unit 41 of the imaging device 20, the wireless communication unit 41 supplies the instruction signal obtained by receiving the wireless signal to the controller 45. The controller 45 performs the status control for disabling the function of the illumination unit 39 based on the instruction signal.

In step ST 63, the controller 85 performs the status control for enabling the illumination function of the information processing device 60. The controller 45 performs the status control for enabling the function of the illumination unit 74, and when, for example, it is determined to be necessary to use illumination during imaging, the illumination unit 74 of the information processing device 60 is set to on status to perform imaging.

In step ST64, the controller 85 issues an instruction of the status control for enabling the illumination function of the imaging device 20. The controller 85 supplies an instruction signal of the status control for enabling the function of the illumination unit 39 in the imaging device 20 to the wireless communication unit 71 and causes the wireless communication unit 71 to transmit it as a wireless signal to the imaging device 20. When the wireless signal is received by the wireless communication unit 41 of the imaging device 20, the wireless communication unit 41 supplies the instruction signal obtained by receiving the wireless signal to the controller 45. The controller 45 performs the status control for enabling the function of the illumination unit 39 based on the instruction signal, and when, for example, it is determined to be necessary to use illumination during imaging, the illumination unit 39 of the image 20 is set to on status to perform imaging.

In this way, in the second status control, when it is determined that the imaging device and the information processing device are attached to each other based on the attachment/detachment information, for example, the status control for disabling the illumination function of the imaging device and for enabling the illumination function of the information processing device is performed. Thus, when the imaging device and the information processing device are in the attachment status, the imaging is performed using the illumination unit of the information processing device, thereby reducing the power consumption of the imaging device.

In addition, in the second status control, for example, the case where the imaging device 20 is provided with the illumination unit 39 has been described, but the imaging device 20 may be configured without the illumination unit 39. In this case, the imaging device or the information processing device performs the status control for enabling the illumination function of the information processing device when the attachment/detachment information indicates that the imaging device and the information processing device are attached to each other. Thus, even if the illumination unit 39 is not provided, it is possible to generate a captured image having satisfactory brightness using the illumination unit of the information processing device when the imaging device and the information processing device are attached to each other.

In FIG. 13 (or FIG. 14), the determination of whether they are attached is performed in step ST51 (or step ST61), but alternatively the detection of the attachment/detachment information currently indicating the attachment status and the status control based on the detection result may be performed instead of the determination of whether they are attached.

[5-2-3. Third Status Control]

The description will be given of a third status control. There will be described a case where, in the third status control, as the status control of the imaging device 20, the status control of a function that influences power consumption is performed, for example, the status control for various sensors of the imaging device is performed.

The imaging device and the information processing device are operable in any status of the attachment and detachment statuses as described above. In this regard, in a case where the imaging device and the information processing device are provided with respective sensors having an equivalent function, when the imaging device and the information processing device are in the attachment status and are integrated, the sensors having an equivalent function will be provided redundantly. Thus, when the imaging device and the information processing device are in the attachment status, the imaging device performs the status control for stopping the operation of a sensor having the equivalent function to the sensor of the information processing device, that is, the sensor having an alternative function in the information processing device, thereby reducing the power consumption. In addition, the imaging device performs a process using a sensor signal generated by the sensor of the information processing device. Examples of the sensor in the imaging device and the information processing device include a positioning sensor used to determine the current position, a direction sensor for determining the orientation of the devices, and a posture determination sensor for determining the posture or posture change of the devices. The mode for stopping the operation on the sensor of the imaging device having the alternative function in the information processing device 60 when the imaging device and the information processing device are attachment status may be previously set by the user.

Figure 15:
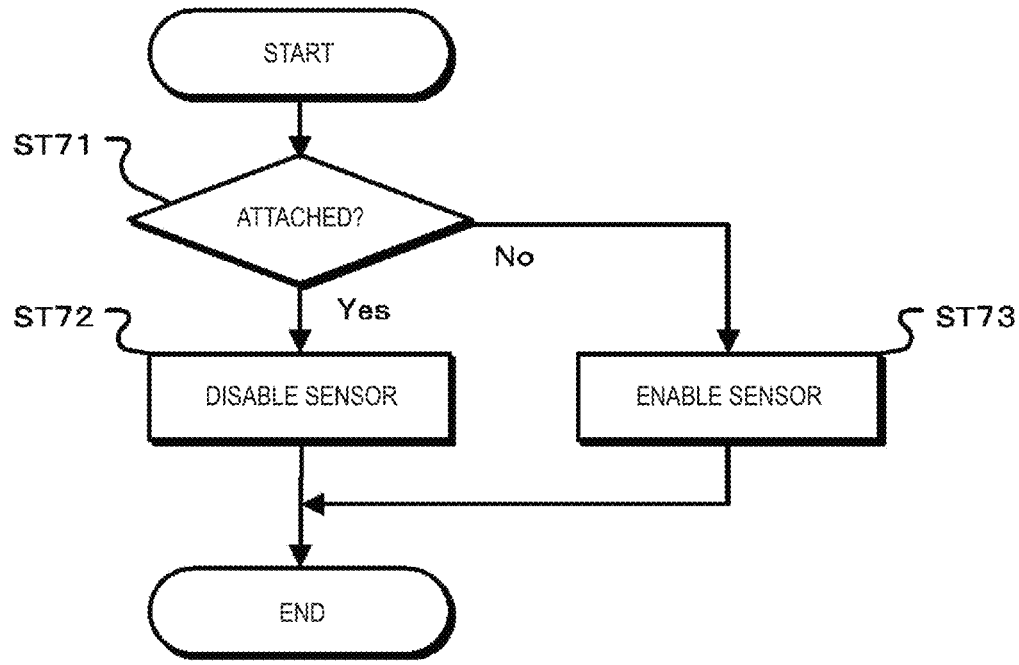
FIG. 15 is a flowchart illustrating a process in the case when the controller of the imaging device performs a third status control.

FIG. 15 is a flowchart illustrating a process in the case where the third status control is performed by the controller of the imaging device.

In step ST71, the controller 45 determines whether the imaging device 20 and the information processing device 60 are attached to each other. If the imaging device 20 and the information processing device 60 are determined by the controller 45 to be attached to each other based on the attachment/detachment information outputted from the attachment/detachment determination unit 91, the process proceeds to step ST72. If it is determined that they are in the detachment status, the process proceeds to step ST73.

In step ST72, the controller 45 performs the status control for disabling the sensor. The controller 45 performs the status control for setting a sensor among the sensors 36, which has a function that can be replaced by the sensor 76 of the information processing device 60, to a status in which the power supply is stopped.

In step ST73, the controller 45 performs the status control for enabling the sensor. The controller 45 performs the status control for setting a sensor among the sensors 36, which has a function that can be replaced by the sensor 76 of the information processing device 60, to a status in which the power is supplied.

Figure 16:
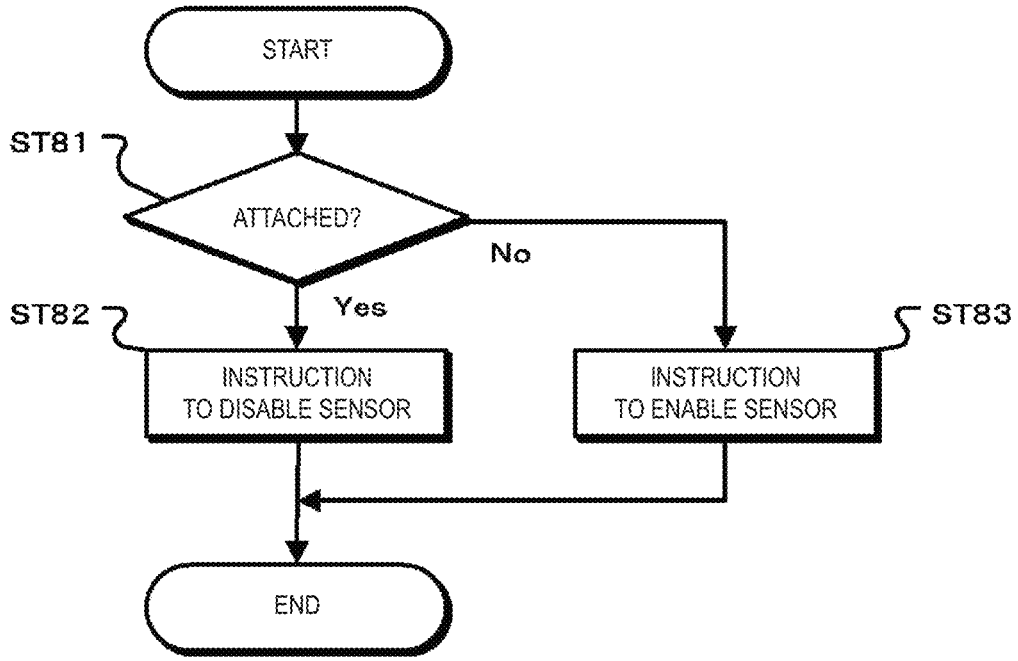
FIG. 16 is a flowchart illustrating a process in the case when the controller of the information processing device performs the third status control.

FIG. 16 is a flowchart illustrating a process in the case where the third status control is performed by the controller of the information processing device.

In step ST81, the controller 85 determines whether the imaging device 20 and the information processing device 60 are attached to each other. If the imaging device 20 and the information processing device 60 are determined by the controller 85 to be attached to each other based on the attachment/detachment information outputted from the attachment/detachment determination unit 91, the process proceeds to step ST82. If it is determined that they are in the detachment status, the process proceeds to step ST83.

In step ST82, the controller 85 issues an instruction of the status control for disabling the sensor. The controller 85 supplies an instruction signal of the status control for disabling the sensor of the imaging device 20 to the wireless communication unit 71 and causes the wireless communication unit 71 to transmit it as a wireless signal to the imaging device 20. When the wireless signal is received by the wireless communication unit 41 of the imaging device 20, the wireless communication unit 41 supplies the instruction signal obtained by receiving the wireless signal to the controller 45. The controller 45 stops the power supply to the sensor having a function that can be replaced by the sensor 76 of the information processing device 60 in the sensor unit 36 based on the instruction signal.

In step ST83, the controller 85 performs the status control for enabling the sensor. The controller 85 supplies an instruction signal of the status control for enabling the sensor of the imaging device 20 to the wireless communication unit 71 and causes the wireless communication unit 71 to transmit it as a wireless signal to the imaging device 20. When the wireless signal is received by the wireless communication unit 41 of the imaging device 20, the wireless communication unit 41 supplies the instruction signal obtained by receiving the wireless signal to the controller 45. The controller 45 supplies the power to the sensor having a function that can be replaced by the sensor 76 of the information processing device 60 in the sensor unit 36.

In this way, in the third status control, if it is determined that the imaging device and the information processing device are in the attachment status based on the attachment/detachment information, then, for example, the power supply to the sensor having a function that can be replaced by the sensor 76 of the information processing device 60 in the sensor unit 36 of the imaging device 20 is stopped. Thus, when the imaging device and the information processing device are in the attachment status, it is possible to reduce the power consumption of the imaging device 20.

In FIG. 15 (or FIG. 16), the determination of whether they are attached is performed in step ST71 (or step ST81), but alternatively the detection of the attachment/detachment information currently indicating the attachment status and the status control based on the detection result may be performed instead of the determination of whether they are attached.

[5-2-4. Fourth Status Control]

The description will be given of a fourth status control. There will be described a case where, in the fourth status control, the status control for a frame rate of image information provided from the imaging device to the information processing device, for example, the status control for a frame rate of a live view image is performed. In the imaging device, even if the imaging device and the information processing device are in the detachment status, the frame rate of the captured image is recorded on a recording medium without lowering the frame rate.

The imaging device and the information processing device are operable in any status of the attachment and detachment statuses as described above. In this regard, the communication environment in the case where the imaging device and the information processing device are in the detachment status is more deteriorated than the case where the imaging device and the information processing device are in the attachment status. Thus, the imaging device and the information processing device that are in the detachment status perform the status control for lowering the frame rate of the image information supplied from the imaging device to the information processing device, as compared to the case where the imaging device and the information processing device are in the attachment status. The mode for lowering the frame rate of the image information supplied from the imaging device to the information processing device in the case where the imaging device and the information processing device are in the detachment status may be preset by the user.

Figure 17:
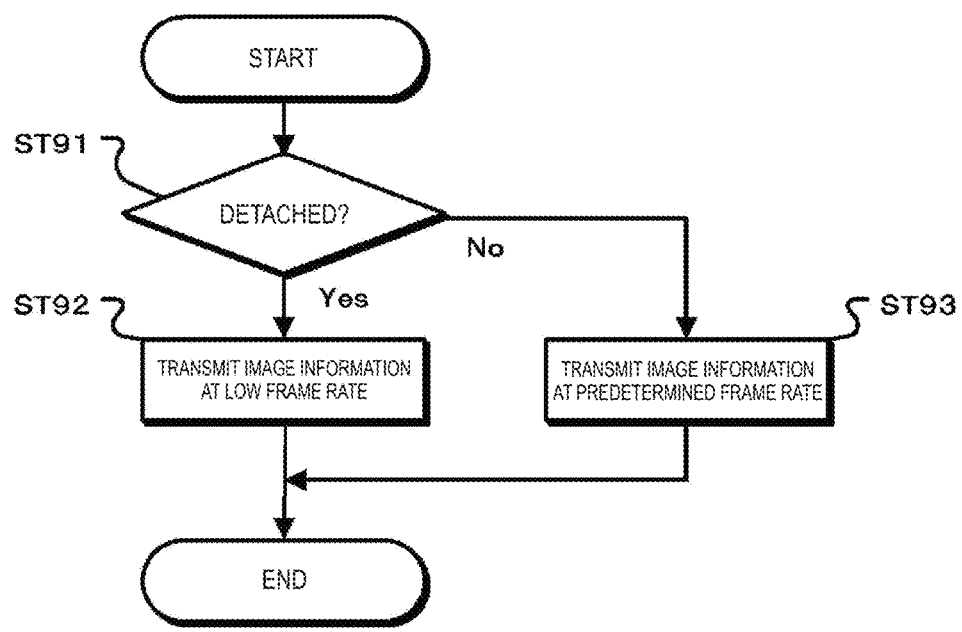
FIG. 17 is a flowchart illustrating a process in the case when the controller of the imaging device performs a fourth status control.

FIG. 17 is a flowchart illustrating a process in the case where the fourth status control is performed by the controller of the imaging device.

In step ST91, the controller 45 determines whether the imaging device 20 and the information processing device 60 are detached from each other. If the imaging device 20 and the information processing device 60 are determined by the controller 45 to be detached from each other based on the attachment/detachment information outputted from the attachment/detachment determination unit 91, the process proceeds to step ST92. If it is determined that they are in the attachment status, the process proceeds to step ST93.

In step ST92, the controller 45 performs the status control for transmitting image information at a low frame rate. The controller 45 causes the wireless communication unit 41 to transmit the image information to the information processing device 60 at a lower frame rate (e.g. 15 frames/sec) than a predetermined frame rate (e.g. 30 frames/sec).

In step ST93, the controller 45 transmits the image information at a predetermined frame rate. The controller 45 causes the wireless communication unit 41 to transmit the image information of the captured image to the information processing device 60 at a predetermined frame rate.

Figure 18:
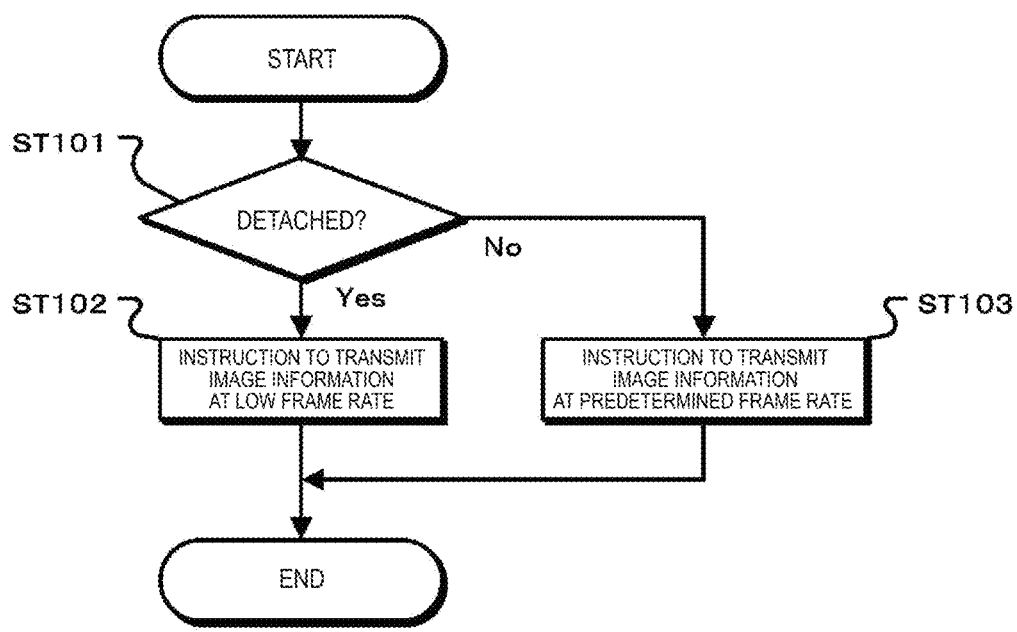
FIG. 18 is a flowchart illustrating a process in the case when the controller of the information processing device performs the fourth status control.

FIG. 18 is a flowchart illustrating a process in the case where the fourth status control is performed by the controller of the information processing device.

In step ST101, the controller 85 determines whether the imaging device 20 and the information processing device 60 are detached from each other. If the imaging device 20 and the information processing device 60 are determined by the controller 85 to be detached from each other based on the attachment/detachment information outputted from the attachment/detachment determination unit 91, the process proceeds to step ST102. If it is determined that they are in the attachment status, the process proceeds to step ST103.

In step ST102, the controller 85 issues an instruction to transmit the image information at a low frame rate. The controller 85 supplies an instruction signal for instructing the transmission of the image information at a low frame rate to the wireless communication unit 71 and causes the wireless communication unit 71 to transmit it as a wireless signal to the imaging device 20. When the wireless signal is received by the wireless communication unit 41 of the imaging device 20, the wireless communication unit 41 supplies the instruction signal obtained by receiving the wireless signal to the controller 45. The controller 45 performs the status control based on the instruction signal, and causes the wireless communication unit 41 to transmit the image information of the captured image to the information processing device 60 at a lower frame rate than a predetermined frame rate.

In step ST103, the controller 85 issues an instruction to transmit the image information at a predetermined frame rate. The controller 85 supplies an instruction signal for instructing the transmission of the image information at a predetermined frame rate to the wireless communication unit 71 and causes the wireless communication unit 71 to transmit it as a wireless signal to the imaging device 20. In this regard, when the wireless signal indicating the instruction to enable the illumination function is received by the wireless communication unit 41 of the imaging device 20, the wireless communication unit 41 supplies the instruction signal obtained by receiving the wireless signal to the controller 45. The controller 45 performs the status control based on the instruction signal, and causes the wireless communication unit 41 to transmit the image information of the captured image to the information processing device 60 at a predetermined frame rate.

When the fourth status control is performed by the controller 45 of the imaging device 20 or the controller 85 of the information processing device 60, the image information may be transmitted by adjusting a frame rate to be corresponded to the separation distance between the imaging device 20 and the information processing device 60. The separation distance can be estimated, for example, based on the electric field intensity or propagation loss of the wireless signal when the wireless signal is received from the information processing device 60. In addition, the separation distance can be also estimated based on the amplification factor in the case of amplifying the received wireless signal to a desired signal level, the propagation time of the wireless signal between the imaging device 20 and the information processing device 60, or the like.

In this way, in the fourth status control, when it is determined that the imaging device 20 and the information processing device 60 are detached from each other, for example, the image information is transmitted from the imaging device 20 to the information processing device 60 at a lower frame rate than a predetermined frame rate in the attachment status. Thus, even when the imaging device 20 and the information processing device 60 are detached from each other and the frame is dropped due to the deterioration of the communication environment, the image information is transmitted at a low frame rate, and thus it is possible to display an image that is less influenced by the drop frame than the predetermined frame rate.

In FIG. 17 (or FIG. 18), the determination of whether they are detached is performed in step ST91 (or step ST101), but alternatively the detection of the attachment/detachment information currently indicating the detachment status and the status control based on the detection result may be performed instead of the determination of whether they are detached.

[5-2-5. Fifth Status Control]

The description will be given of a fifth status control. In the fifth status control, the status control for a recording start operation or a recording end operation will be described.

The imaging device and the information processing device are operable in any status of the attachment and detachment status as described above. In this regard, in the case where the information processing device is set to output operation sound, when the imaging device and the information processing device are in the attachment status, there is a risk that the operation sound at start of recording or at end of recording is recorded. Thus, when the imaging device and the information processing device are in the attachment status, the status control for setting output of the operation sound for starting the recording or for ending the recording to timing for preventing the operation sound from being recorded.

Figure 19:
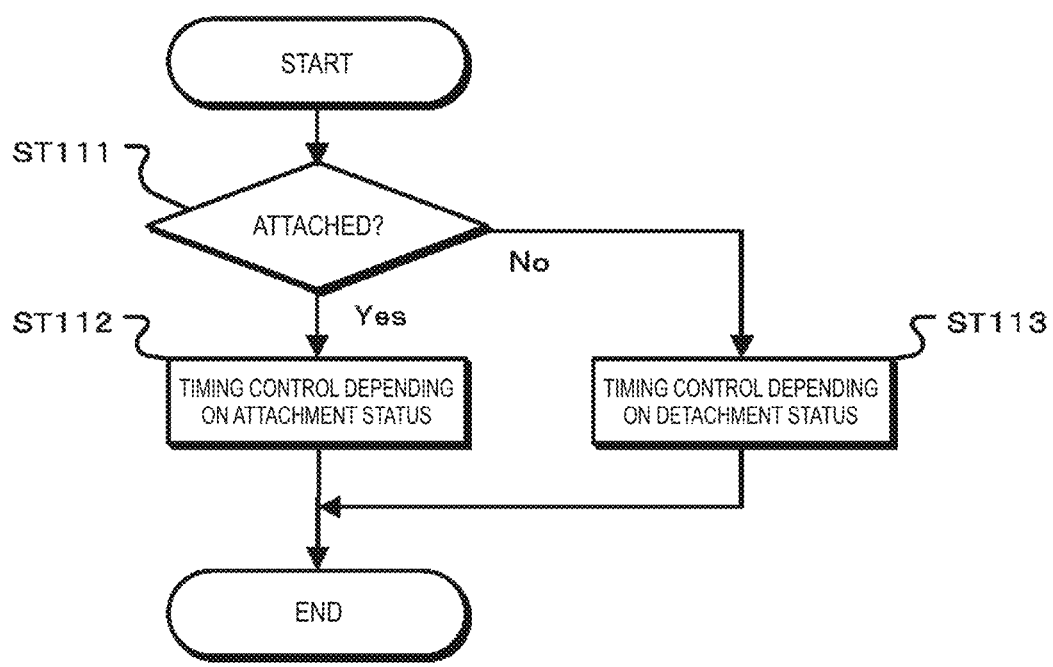
FIG. 19 is a flowchart illustrating a process of a fifth status control.

FIG. 19 is a flowchart illustrating a process in the case where the fifth status control is performed by the controller of the information processing device.

In step ST111, the controller 85 determines whether the imaging device 20 and the information processing device 60 are attached to each other. If the imaging device 20 and the information processing device 60 are determined by the controller 85 to be attached to each other based on the attachment/detachment information outputted from the attachment/detachment determination unit 91, the process proceeds to step ST112. If it is determined that they are in the detachment status, the process proceeds to step ST113.

In step ST112, the controller 85 performs the timing control depending on the attachment status. When the recording start operation is performed, the controller 85 causes the sound input/output unit 72 to output the operation sound for starting the recording and instructs the imaging device 20 to start recording after output of the operation sound is completed. The controller 85 supplies the instruction signal of the recording start instruction to the wireless communication unit 71 and causes the wireless communication unit 71 to transmit it as a wireless signal to the imaging device 20. When the wireless signal is received by the wireless communication unit 41 of the imaging device 20, the wireless communication unit 41 supplies the instruction signal obtained by receiving the wireless signal to the controller 45. The controller 45 starts recording based on the instruction signal. In addition, when the recording end operation is performed, the controller 85 issues an instruction to end the recording. The controller 85 supplies the instruction signal of the recording end instruction to the wireless communication unit 71, and causes the wireless communication unit 71 to transmit it as a wireless signal to the imaging device 20. When the wireless signal is received by the wireless communication unit 41 of the imaging device 20, the wireless communication unit 41 supplies the instruction signal obtained by receiving the wireless signal to the controller 45. The controller 45 ends the recording based on the instruction signal. Furthermore, the controller 85 causes the sound input/output unit 72 to output the operation sound of the recording end operation after the lapse of the time necessary from the recording end operation to completion of the recording by the imaging device 20.

In step ST113, the controller 85 performs the timing control depending on the detachment status. When the recording start operation is performed, the controller 85 causes the sound input/output unit 72 to output the operation sound for starting the recording and the controller 85 instructs the imaging device 20 to start recording. The controller 85 supplies the instruction signal of the recording start instruction to the wireless communication unit 71 and causes the wireless communication unit 71 to transmit it as a wireless signal to the imaging device 20. When the wireless signal is received by the wireless communication unit 41 of the imaging device 20, the wireless communication unit 41 supplies the instruction signal obtained by receiving the wireless signal to the controller 45. The controller 45 starts recording based on the instruction signal. In addition, when the recording end operation is performed, the controller 85 causes the sound input/output unit 72 to output the operation sound for ending the recording and instructs the imaging device 20 to end the recording. The controller 85 supplies the instruction signal of the recording end instruction to the wireless communication unit 71, and causes the wireless communication unit 71 to transmit it as a wireless signal to the imaging device 20. When the wireless signal is received by the wireless communication unit 41 of the imaging device 20, the wireless communication unit 41 supplies the instruction signal obtained by receiving the wireless signal to the controller 45. The controller 45 ends the recording based on the instruction signal.

In addition, when the fifth status control is performed by the controller 45 of the imaging device 20, the operation sound for starting the recording or for ending the recording to be performed by the information processing device 60 may be outputted based on the instruction from the controller 45 of the imaging device 20. For example, the controller 45 causes the information processing device 60 to output the operation sound during a predetermined period of time and then starts the recording in response to the notification of the recording start operation from the information processing device 60. In addition, the controller 45 ends the recording in response to the recording end operation from the information processing device 60 and then causes the information processing device 60 to output the operation sound during a predetermined period of time.

Figure 20:
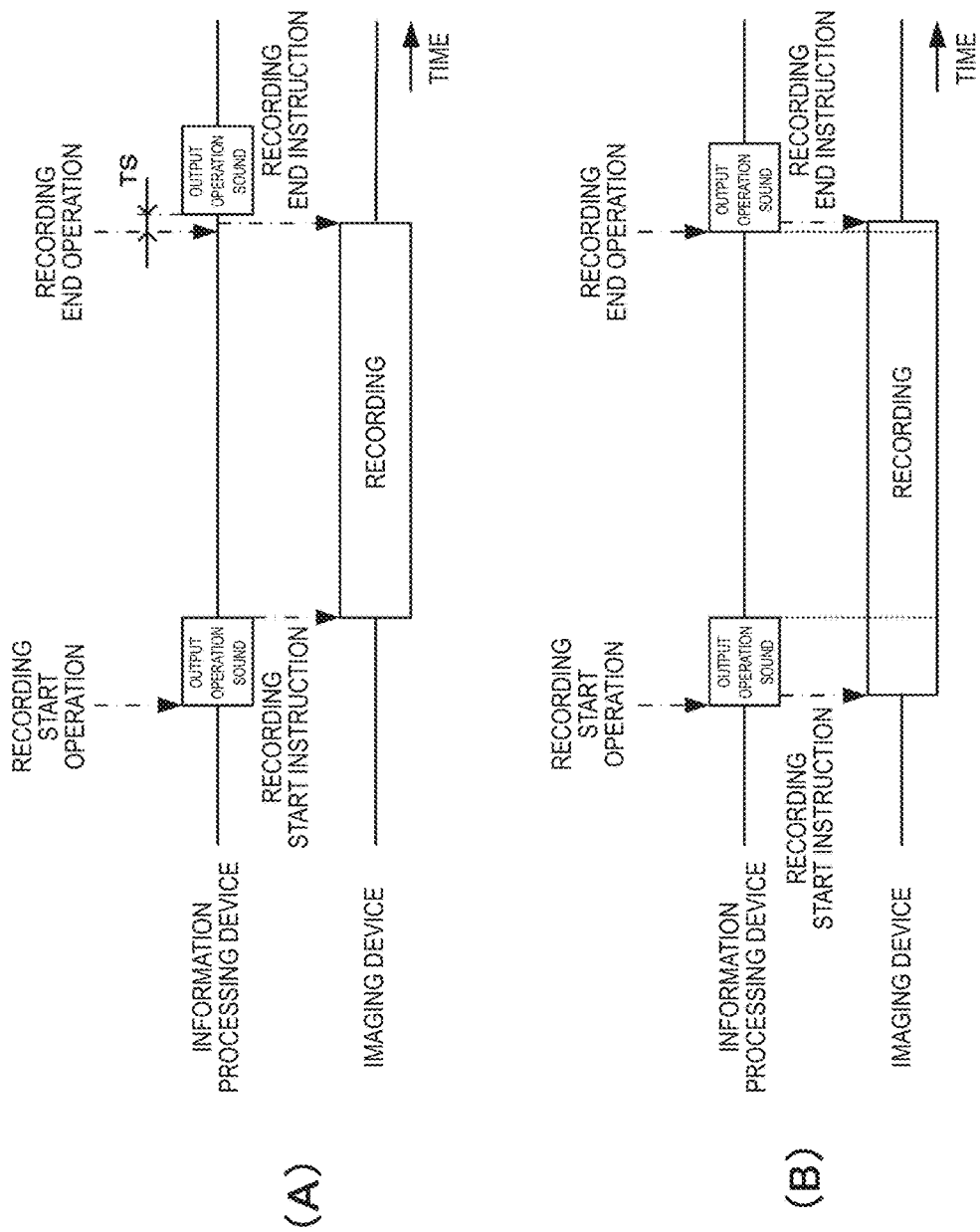
FIG. 20 is a diagram illustrating an exemplary operation of the fifth status control.

FIG. 20 illustrates an exemplary operation of the fifth status control. The part (A) of FIG. 20 illustrates a case where the timing control depending on the attachment status is performed, and the part (B) of FIG. 20 illustrates a case where the timing control depending on the attachment status is not performed.

As shown in the part (A) of FIG. 20, when the recording start operation is performed in the information processing device, the information processing device outputs the operation sound for starting the recording and issues the recording start instruction to the imaging device after the output of the operation sound is completed. The imaging device starts the recording based on this instruction. Then, when the recording end operation is performed in the information processing device, the information processing device issues a recording end instruction to the imaging device. The imaging device ends the recording based on this instruction. In addition, the information processing device outputs the operation sound of the recording end operation after the lapse of a time TS that is necessary from the issue of the recording end instruction to the end of recording in the imaging device. Thus, it is possible to prevent the operation sound from being recorded during the recording.

On the other hand, in the case where the timing control depending on the attachment status is not performed, as shown in the part (B) of FIG. 20, when the recording start operation is performed in the information processing device, the information processing device outputs the operation sound for starting the recording and issues a recording start instruction to the imaging device. The imaging device performs the status control based on this instruction to start the recording. Thus, the operation sound will be recorded at the time of starting the recording. Then, when the recording end operation is performed in the information processing device, the information processing device outputs the operation sound for ending the recording and issues an recording end instruction to the imaging device. The imaging device performs the status control based on this instruction to end the recording. In this way, in the case where the timing control depending on the attachment status is not performed, it is not possible to prevent the operation sound from being recorded during the recording.

Thus, in the fifth status control, when the imaging device 20 and the information processing device 60 are determined to be attached to each other, the timing of recording or operation sound is controlled so that the operation sound for starting or ending the recording may be prevented from being recorded during the recording. Therefore, it is possible to prevent unnecessary sound from being recorded during the recording.

In the case where the separation distance between the imaging device 20 and the information processing device 60 is shorter than a predetermined distance at which the operation sound is not recording during the recording, when the imaging device 20 is in the operation mode for recording the sound, the information processing device 60 may perform a sound output stop control. The separation distance may be estimated based on the electric field intensity or propagation loss of the wireless signal, the amplification factor in the case of amplifying the received wireless signal to a desired signal level, the propagation time of the wireless signal, or the like, as described above. In addition, the determination of whether they are detached is performed in step ST111 of FIG. 19, but alternatively the detection of the attachment/detachment information currently indicating the detachment status and the status control based on the detection result may be performed instead of the determination of whether they are detached.

[5-2-6. Sixth Status Control]

The description will be given of a sixth status control. In the sixth status control, the status control for an imaging mode will be described.

The imaging device and the information processing device are operable in any status of the attachment and detachment statuses as described above. In this regard, in the case where the information processing device is set to output operation sound, when the imaging device and the information processing device are in the attachment status, if the imaging device is in the operation mode in which sound is recorded, for example, a moving-image imaging mode, there is a risk that the operation sound at start of recording or at end of recording is recorded in the imaging device. In addition, if the imaging device is in the operation mode in which sound is not recorded, for example, a still-image imaging mode, the operation sound outputted from the information processing device does not influence the operation of the imaging device. Thus, when the imaging device and the information processing device are in the attachment status and the imaging device is in the operation mode in which the sound is recorded, the status control is performed so that the operation sound is prevented from being outputted from the information processing device.

Figure 21:
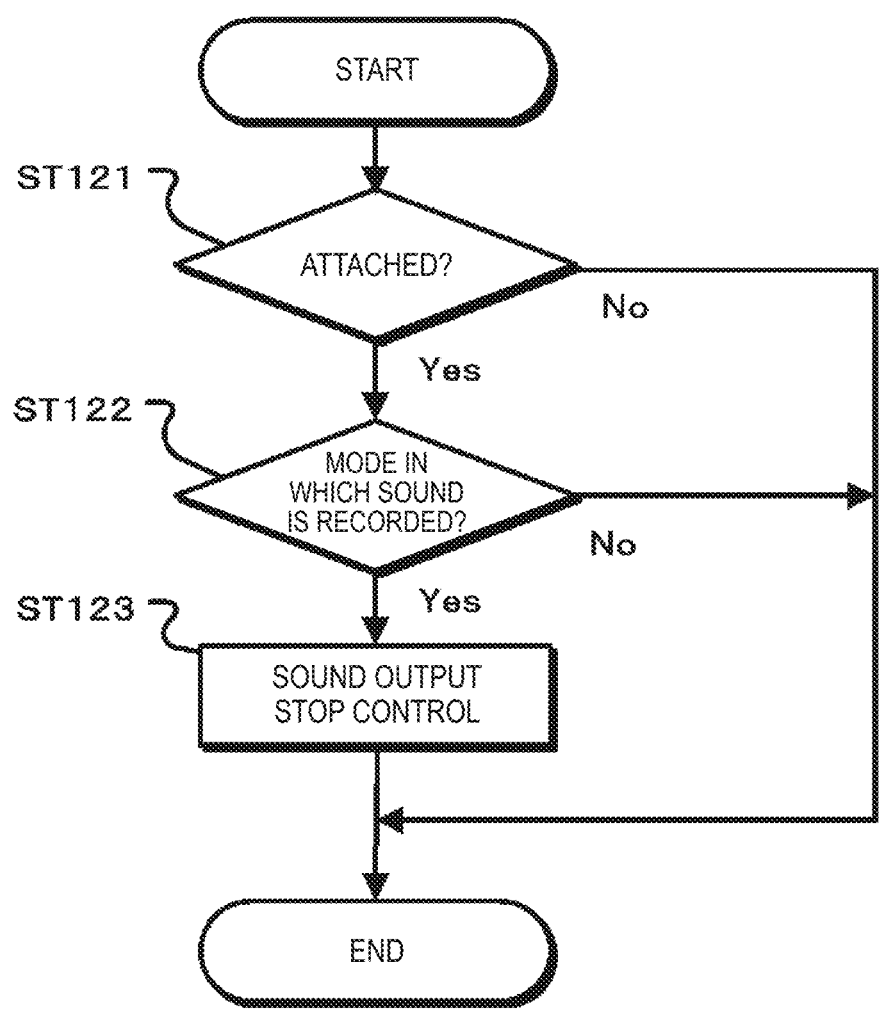
FIG. 21 is a flowchart illustrating a process of a sixth status control.

FIG. 21 is a flowchart illustrating a process in a case where the sixth status control is performed by the controller of the information processing device.

In step ST121, the controller 85 determines whether the imaging device 20 and the information processing device 60 are attached to each other. If the imaging device 20 and the information processing device 60 are determined by the controller 85 to be attached to each other based on the attachment/detachment information outputted from the attachment/detachment determination unit 91, the process proceeds to step ST122. If it is determined that they are in the detachment status, the process is terminated.

In step ST122, the controller 85 determines whether the sound is recorded in the operation mode. The controller 85 determines whether the operation mode of the imaging device 20 is an operation mode in which the sound is recorded. When the operation mode is determined that the sound is recorded, the process proceeds to step ST123. If the operation mode is determined that the sound is not recorded, the process is terminated.

In step ST123, the controller 85 performs a sound output stop control. The controller 85 terminates the process, for example, by preventing the operation sound to be outputted from the sound input/output unit from being outputted.

In addition, in the case where the sixth status control is performed by the controller 45 of the imaging device 20, the controller 45 instructs the information processing device 60 not to output the operation sound if the operation mode is a mode in which the sound is recorded. The controller 45 supplies an instruction signal of the status control for preventing the operation sound from being outputted in the information processing device 60 to the wireless communication unit 71, and causes the wireless communication unit 71 to transmit it as a wireless signal to the information processing device 60. When the wireless signal is received by the wireless communication unit 71 of the information processing device 60, the wireless communication unit 71 supplies the instruction signal obtained by receiving the wireless signal, the controller 85 performs the operation in which the operation sound is prevented from being outputted based on the instruction signal.

FIG. 22 illustrates an exemplary operation of the sixth status control. The part (A) of FIG. 26 illustrates a case where the imaging device 20 is set to the operation mode in which the sound is not recorded, for example, the still-image imaging mode. The part (B) of FIG. 20 illustrates a case where the imaging device 20 is set to the operation mode in which the sound is recorded, for example, the operation imaging mode.

As shown in the part (A) of FIG. 22, the sound output stop control is not performed in the still-image imaging mode. Thus, when the shutter button 811 displayed on the screen of the display unit 81, the user can determine that the still image is recorded by the operation sound from the fact that the operation sound (shutter sound) is outputted from the information processing device 60. In addition, as shown in the part (B) of FIG. 22, the sound output stop control is performed in the operation imaging mode. Thus, for example, when a recording button 812 displayed of the display unit 81, the operation sound is prevented from being outputted from the information processing device 60. Thus, it is possible to prevent the operation sound from being recorded at the time of recording a moving image.

In this way, in the sixth status control, in the case where the imaging device 20 and the information processing device 60 are determined to be attached to each other, when the imaging device 20 is in the operation mode in which the sound is recorded, the operation sound is prevented from being outputted from the information processing device 60. Thus, it is possible to prevent the operation sound from being recorded.

In the case where the separation distance between the imaging device 20 and the information processing device 60 is shorter than a predetermined distance at which the operation sound is not recording during the recording, when the imaging device 20 is in the operation mode for recording the sound, the information processing device 60 may perform a sound output stop control. The separation distance may be estimated based on the electric field intensity or propagation loss of the wireless signal, the amplification factor in the case of amplifying the received wireless signal to a desired signal level, the propagation time of the wireless signal, or the like, as described above. In addition, the determination of whether they are detached is performed in step ST121 of FIG. 21, but alternatively the detection of the attachment/detachment information currently indicating the detachment status and the status control based on the detection result may be performed instead of the determination of whether they are detached.

Furthermore, the processing sequence that is explained in the specification can be implemented by hardware, by software and by a configuration that combines hardware and software. In a case where the processing is implemented by software, it is possible to install in memory within a computer that is incorporated into dedicated hardware a program in which the processing sequence is encoded and to execute the program. It is also possible to install a program in a general-purpose computer that is capable of performing various types of processing and to execute the program.

For example, the program can be recorded on a hard disk, solid status drive (SSD) or read only memory (ROM) as a recording medium in advance. Alternatively, the program can be temporarily or permanently stored (recorded) in (on) a removable recording medium such as a flexible disk, compact disc read only memory (CD-ROM), magneto optical (MO) disk, digital versatile disc (DVD), Blu-ray disc (BD, registered trademark), a magnetic disk, or a semiconductor memory card. Such a removable recording medium can be provided as so-called package software.

In addition, the program can be, not only installed on a computer from a removable recording medium, but also transferred wirelessly or by wire to the computer from a download site via a network such as a local area network (LAN) or the Internet. In such a computer, a program transferred in the aforementioned manner can be received and installed on a recording medium such as built-in hardware.

In addition, it should be understood by those skilled in the art that various modifications, combinations, sub-combinations and alterations may occur depending on design requirements and other factors insofar as they are within the scope of the appended claims or the equivalents thereof.

Additionally, the imaging system according to the present technology may also be configured as below.

(1) An imaging system including:
a controller configured to perform a status control of an imaging device or a status control of an information processing device depending on attachment/detachment information indicating whether the imaging device and the information processing device are in an attachment status in which the imaging device and the information processing device are attached to each other or in a detachment status in which the imaging device and the information processing device are detached from each other.

(2) The imaging system according to (1), further including:
an attachment/detachment determination unit configured to determine whether the devices are in the attachment status or in the detachment status depending on attachment/detachment information indicating whether the imaging device and the information processing device are in the attachment status or in the detachment status.

(3) The imaging system according to (1) or (2),
wherein the controller sets a limit on a function of the imaging device or the information processing device as the status control.

(4) The imaging system according to (3),
wherein the controller sets a limit on a function influencing a status of a captured image as the status control of the imaging device.

(5) The imaging system according to (4),
wherein the controller, when the attachment/detachment information indicates that the devices are in the detachment status, limits a focus adjustment function of the imaging device to an autofocus function as the status control of the imaging device.

(6) The imaging system according to (4) or (5),
wherein the controller, when the attachment/detachment information indicates that the devices are in the attachment status, stops an illumination function of the imaging device as the status control of the imaging device.

(7) The imaging system according to any of (4) to (6),
wherein the controller, when the attachment/detachment information indicates that the devices are in the detachment status, causes a frame rate of a captured image supplied from the imaging device to the information processing device to be lower than a case where the attachment/detachment information indicates that the devices are in the attachment status, as the status control of the imaging device.

(8) The imaging system according to any of (3) to (7),
wherein the controller sets a limit on a function influencing a power consumption as the status control of the imaging device.

(9) The imaging system according to (8),
wherein the controller, when the attachment/detachment information indicates that the devices are in the attachment status, stops a power supply to a sensor of the imaging device having a similar function to a sensor provided in the information processing device, as the status control of the imaging device.

(10) The imaging system according to (9),
wherein the sensor of the imaging device includes a sensor for detecting at least any one of a position, posture, and orientation.

(11) The imaging system according to any of (3) to (10),
wherein the controller sets a mode to a mode preset by the user depending on the attachment/detachment information as the status control of the imaging device.

(12) The imaging system according to any of (3) to (12),
wherein the controller notifies a user that a transition to a specified status of the imaging device is preferable depending on the attachment/detachment information as the status control of the imaging device.

(13) The imaging system according to any of (3) to (12),
wherein the information processing device includes an operation sound output unit configured to output an operation sound, and
wherein the controller, when the attachment/detachment information indicates that the devices are in the attachment status, performs a control for starting a recording operation after an operation sound indicating a recording start operation is outputted or a control for ending the recording operation before an operation sound indicating a recording end operation is outputted, as the status control of the imaging device or the status control of the information processing device.

(14) The imaging system according to any of (3) to (13),
wherein the information processing device includes an operation sound output unit configured to output an operation sound, and
wherein the controller, when the attachment/detachment information indicates that the devices are in the attachment status, performs a control for preventing the operation sound from being outputted in an operation mode in which the imaging device records a sound, as the status control of the information processing device.

(15) The imaging system according to any of (1) to (14), wherein the imaging device and the information processing device communicate with each other, and the information processing device displays a captured image obtained from the imaging device.

INDUSTRIAL APPLICABILITY

In the present technology, the status control of the imaging device or the information processing device is performed depending on the attachment/detachment information indicating that the imaging device and the information processing device are in the attachment status in which they are attached to each other or in the detachment status in which they are detached from each other. Thus, it is possible to perform easily the status control of the imaging device or the information processing device. Accordingly, the imaging device having no display function can be attached to or detached from the information processing device such as a smartphone, and thus It is suitable for the imaging system configured so that communication between the imaging device and the information processing device can be performed, for example, the captured image generated by the imaging device can be checked by the information processing device.

REFERENCE SIGNS LIST 10 imaging system
15 controller
20 imaging device
21 outer cylindrical portion
22 control ring
31 imaging optical system
32 imaging unit
33 image processor
34, 75 recording and reproducing unit
35, 78 power supply
36, 76 sensor
37, 77 storage unit
38, 81 display unit
39, 74 illumination unit
41, 71 wireless communication unit
44, 82 operation input unit
45, 85 controller
46, 86 recording medium
50 mounting mechanical portion
51, 52 mounting member
60 information processing device
61 outer casing
62 display panel
72 sound input/output unit
73 imaging block
91 attachment/detachment determination unit
441 zoom button
442, 811 shutter button
812 recording button

The invention claimed is:

1. An imaging system, comprising:
   a controller configured to:
      determine that an imaging device and an information processing device are in one of an attachment status or a detachment status, based on attachment/detachment information,
         wherein the attachment/detachment information indicates that the imaging device and the information processing device are in one of the attachment status or the detachment status, and
         wherein the attachment status is a status in which the imaging device is attached to the information processing device and the detachment status is a status in which the imaging device is detached from the information processing device; and
      change a mode of the imaging device from a manual focus mode to an autofocus mode, based on the determination that the imaging device and the information processing device are in the detachment status.

2. The imaging system according to claim 1, further comprising:
   a switch configured to generate a signal that indicates the imaging device and the information processing device are in one of the attachment status or the detachment status, wherein the attachment/detachment information corresponds to the signal.

3. The imaging system according to claim 1, wherein the controller is further configured to set a limit on a function of one of the imaging device or the information processing device, based on the attachment/detachment information.

4. The imaging system according to claim 1, wherein the controller is further configured to stop an illumination function of the imaging device, based on the attachment/detachment information that indicates the imaging device and the information processing device are in the attachment status.

5. The imaging system according to claim 1, wherein the controller is further configured to cause a first frame rate of a captured image supplied from the imaging device to the information processing device to be lower than a second frame rate, based on the attachment/detachment information that indicates the imaging device and the information processing device are in the detachment status.

6. The imaging system according to claim 3, wherein the limit on the function of the imaging device corresponds to a reduction in a power consumption of the imaging device.

7. The imaging system according to claim 6, wherein the controller is further configured to stop a power supply to a sensor of the imaging device, based on the attachment/detachment information that indicates the imaging device and the information processing device are in the attachment status, and
   wherein a function of the sensor of the imaging device is same as a function of a sensor of in the information processing device.

8. The imaging system according to claim 7, wherein the sensor of the imaging device detects at least one of a position, a posture, or an orientation.

9. The imaging system according to claim 1, wherein the imaging device communicates with the information processing device, and the information processing device displays a captured image obtained from the imaging device.

10. The imaging system according to claim 3, wherein the controller is further configured to set a user preset mode of the imaging device, based on the attachment/detachment information.

11. The imaging system according to claim 3, wherein the controller is further configured to notify that the autofocus mode of the imaging device is preferred, and wherein the notification is based on the attachment/detachment information that indicates the imaging device and the information processing device are in the detachment status.

12. The imaging system according to claim 1, wherein the information processing device includes a speaker that outputs an operation sound, wherein the controller is further configured to at least one of control a start of a recording operation subsequent to a first operation sound, indicating a recording start operation, is outputted or control a completion of the recording operation preceding to a second operation sound, indicating a recording end operation, is outputted, and wherein the control is based on the attachment/detachment information that indicates the imaging device and the information processing device are in the attachment status.

13. The imaging system according to claim 1, wherein the information processing device includes a speaker that outputs an operation sound, and wherein the controller is further configured to prevent the speaker to output the operation sound in an operation mode in which the imaging device records a sound, based on the attachment/detachment information that indicates the imaging device and the information processing device are in the attachment status.

14. An imaging control method, comprising:

determining that an imaging device and an information processing device are in one of an attachment status or a detachment status, based on attachment/detachment information,
  wherein the attachment/detachment information indicating that the imaging device and the information processing device are in one of the attachment status or the detachment status, and
  wherein the attachment status is a status in which the imaging device is attached to the information processing device and the detachment status is a status in which the imaging device is detached from the information processing device; and
changing a mode of the imaging device from a manual focus mode to an autofocus mode, based on the determination that the imaging device and the information processing device are in the detachment status.

15. A non-transitory computer-readable medium having stored thereon computer-executable instructions that, when executed by a processor, cause a computer to perform operations, the operations comprising:

determining that an imaging device and an information processing device are in one of an attachment status or a detachment status, based on attachment/detachment information,
  wherein the attachment/detachment information indicating that the imaging device and the information processing device are in one of the attachment status or the detachment status, and
  wherein the attachment status is a status in which the imaging device is attached to the information processing device and the detachment status is a status in which the imaging device is detached from the information processing device; and
changing a mode of the imaging device from a manual focus mode to an autofocus mode, based on the determination that the imaging device and the information processing device are in the detachment status.

16. An imaging device, comprising:

a controller configured to:
  determine that the imaging device and an information processing device are in one of an attachment status or a detachment status, based on attachment/detachment information,
    wherein the attachment/detachment information indicates that the imaging device and the information processing device are in one of the attachment status or the detachment status, and
    wherein the attachment status is a status in which the imaging device is attached to the information processing device and the detachment status is a status in which the imaging device is detached from the information processing device; and
  change a mode of the imaging device from a manual focus mode to an autofocus mode, based on the determination that the imaging device and the information processing device are in the detachment status.

17. The imaging device according to claim 16, wherein the imaging device lacks a function to display a captured image generated by the imaging device.

18. The imaging device according to claim 16, wherein the controller is further configured to control a communication between the imaging device and the information processing device.

19. An information processing device, comprising:

a controller configured to:
  control a communication between the information processing device and an imaging device;
  determine that the imaging device and the information processing device are in one of an attachment status or a detachment status, based on attachment/detachment information,
    wherein the attachment/detachment information indicates that the information processing device and the imaging device are in one of the attachment status or the detachment status, and
    wherein the attachment status is a status in which the information processing device is attached to the imaging device and the detachment status is a status in which the information processing device is detached from the imaging device; and
  change a mode of the imaging device from a manual focus mode to an autofocus mode, based on the determination that the imaging device and the information processing device are in the detachment status.

* * * * *